(12) United States Patent
Ogino

(10) Patent No.: US 8,494,354 B2
(45) Date of Patent: Jul. 23, 2013

(54) FOCUS ADJUSTING APPARATUS AND FOCUS ADJUSTING METHOD

(75) Inventor: Hiroyuki Ogino, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/489,248

(22) Filed: Jun. 5, 2012

(65) Prior Publication Data

US 2012/0243857 A1 Sep. 27, 2012

Related U.S. Application Data

(63) Continuation of application No. 13/150,886, filed on Jun. 1, 2011, now Pat. No. 8,213,784, which is a continuation of application No. 12/704,437, filed on Feb. 11, 2010, now Pat. No. 7,991,280.

(30) Foreign Application Priority Data

Feb. 17, 2009 (JP) ................. 2009-034112

(51) Int. Cl.
*G03B 3/00* (2006.01)
*G03B 3/10* (2006.01)
*G03B 13/34* (2006.01)
*G03B 7/00* (2006.01)
*H04N 5/225* (2006.01)
*H04N 5/238* (2006.01)
*G02B 7/04* (2006.01)

(52) U.S. Cl.
USPC ............. 396/98; 396/102; 396/121; 396/241; 396/505; 348/345; 348/342; 348/363; 250/201.2

(58) Field of Classification Search
USPC ............. 396/89, 98, 102, 121, 125–128, 241, 396/505; 348/345, 347, 342, 354–356, 363; 250/201.2, 201.4
See application file for complete search history.

(56) References Cited

U.S. PATENT DOCUMENTS

| | | | | |
|---|---|---|---|---|
| 6,342,922 B1 * | 1/2002 | Mizoguchi | ............. | 348/355 |
| 7,991,280 B2 * | 8/2011 | Ogino | ............. | 396/98 |
| 8,213,784 B2 * | 7/2012 | Ogino | ............. | 396/98 |

FOREIGN PATENT DOCUMENTS

| | | | |
|---|---|---|---|
| JP | 06-014246 A | 1/1994 | |
| JP | 07-170438 A | 7/1995 | |
| JP | 2006-333052 A | 12/2006 | |
| JP | 2008-197286 A | 8/2008 | |
| JP | 2009-014964 A | 1/2009 | |

* cited by examiner

*Primary Examiner* — Rochelle-Ann J Blackman
(74) *Attorney, Agent, or Firm* — Canon U.S.A., Inc. IP Division

(57) ABSTRACT

There is provided an apparatus that includes a receiving unit configured to receive instructions for focus adjustment; an image-pickup unit configured to perform image-pickup of an object image input through a focus lens; a setting unit configured to set a focus detecting area to be used at a time of detection of a focus state of the focus lens; a light control unit configured to control an amount of light incident on the image-pickup unit; and a focus adjusting unit configured to detect a focus signal representing the focus state in the focus detecting area to move the focus lens based on the focus signal and a position of the focus lens corresponding to the focus signal.

20 Claims, 25 Drawing Sheets

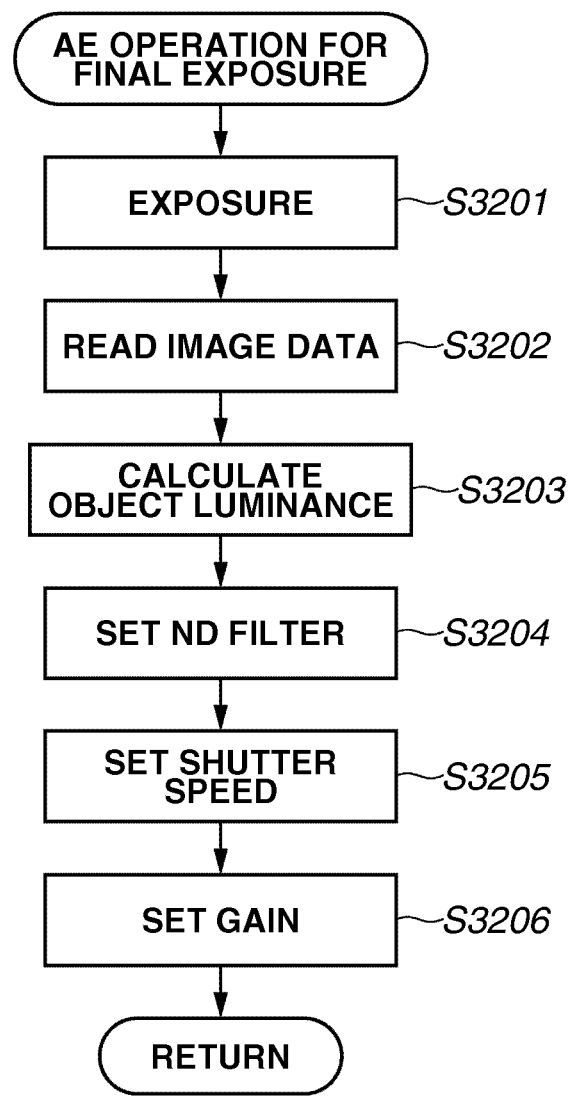

FOCUS ADJUSTING APPARATUS AND FOCUS ADJUSTING METHOD

CROSS-REFERENCE TO RELATED APPLICATIONS

This application is a Continuation of U.S. application Ser. No. 13/150,886 filed Jun. 1, 2011 which claims the benefit of U.S. application Ser. No. 12/704,437, filed Feb. 11, 2010 and Japanese Patent Application No. 2009-034112, filed Feb. 17, 2009, which are hereby incorporated by reference herein in their entireties.

BACKGROUND OF THE INVENTION

1. Field of the Invention

The present invention relates to focus adjusting apparatuses and focus adjusting methods usable in image pickup apparatuses.

2. Description of the Related Art

Conventionally, in a case where automatic focusing (AF) is performed in electronic still cameras and video cameras, a method is used, in which a lens position at which a high frequency component of a luminance signal supplied from an image-pickup element, such as CCD (Charge Coupled Device), is maximum is treated as an in-focus position. The following scan method is known as such a method. In the scan method, an evaluation value (focus evaluation value) calculated based on the high frequency component of the luminance signal obtained from the image-pickup element is successively stored while the lens is driven over its entire move range, and the lens position at which the thus-stored evaluation value exhibits the maximum is treated as the in-focus position.

In another method, a lens continues to be moved in such a direction that the focus evaluation value increases. This method is known as the hill climbing method (also referred to as continuous AF hereinafter).

Further, Japanese Patent No. 4,106,485 discloses the following method. In this method, the continuous AF is executed prior to instructions for image-taking preparation operation to maintain an in-focus state, thereby restricting the move range of a focus lens to be moved by the AF scan method for performing the image-taking preparation operation subsequent to instructions therefor. Thus, the AF operation time is decreased.

In general, in electronic still cameras and the like, a diaphragm is arranged in an image-taking lens to adjust the amount of light input from an object. Further, automatic exposure (AE) control is generally performed prior to instructions for the image-taking preparation operation so that an object image formed in an electronic view finder can have an appropriate brightness. In this AE operation, the diaphragm is controlled.

When the diaphragm is changed, a depth of focus changes. When the depth of focus changes, a focus state varies even if the position of the focus lens remains unchanged. When the diaphragm moves due to the AE operation during the AF scan and the depth of focus changes, the focus evaluation value obtained when the diaphragm is opened cannot be correlated with that obtained when the diaphragm is somewhat closed. Even if the focus adjustment is conducted using the focus evaluation value obtained without considering the state of the diaphragm, precision in the focus adjustment is likely to lower.

Further, an ND (Neutral Density) filter can be used in place of the diaphragm. In electronic still cameras, a lens unit can include plural lenses. In such a case, the ND filter can be interposed between the plural lenses or between the lens and the image-pickup element, and removably inserted into an optical path. The optical path length at the time the ND filter is inserted into the optical path is different from that at the time the ND filter is removed from the optical path. Therefore, even when the position of the focus lens remains unchanged in those states with and without the ND filter, the focus state varies therebetween. Also in the case of the ND filter, when the ND filter is inserted or removed due to the AE operation during the AF scan, the focus evaluation values cannot be correlated with each other for the same reason described above. Thus, precision in the focus adjustment likewise lowers.

SUMMARY OF THE INVENTION

According to the present invention, an apparatus includes a receiving unit configured to receive instructions for focus adjustment, an image-pickup unit configured to perform image-pickup of an object image input through a focus lens, a setting unit configured to set a focus detecting area to be used at a time of detection of a focus state of the focus lens, a light control unit configured to control an amount of light incident on the image-pickup unit, and a focus adjusting unit configured to detect a focus signal representing the focus state in the focus detecting area to move the focus lens based on the focus signal and a position of the focus lens corresponding to the focus signal, wherein the focus adjusting unit controls a first scan operation for detecting the focus signal while moving the focus lens prior to reception of the instructions to determine an object area to be focused and interrupts the first scan operation when a state of the light control unit is changed during the first scan operation.

Further features of the present invention will become apparent from the following description of exemplary embodiments with reference to the attached drawings.

BRIEF DESCRIPTION OF THE DRAWINGS

FIG. 25 is a flow chart showing a subroutine of AE operation for final exposure in the second embodiment.

DESCRIPTION OF THE EMBODIMENTS

Various embodiments of the present invention will be described in detail in accordance with the accompanying drawings.

Figure 1:
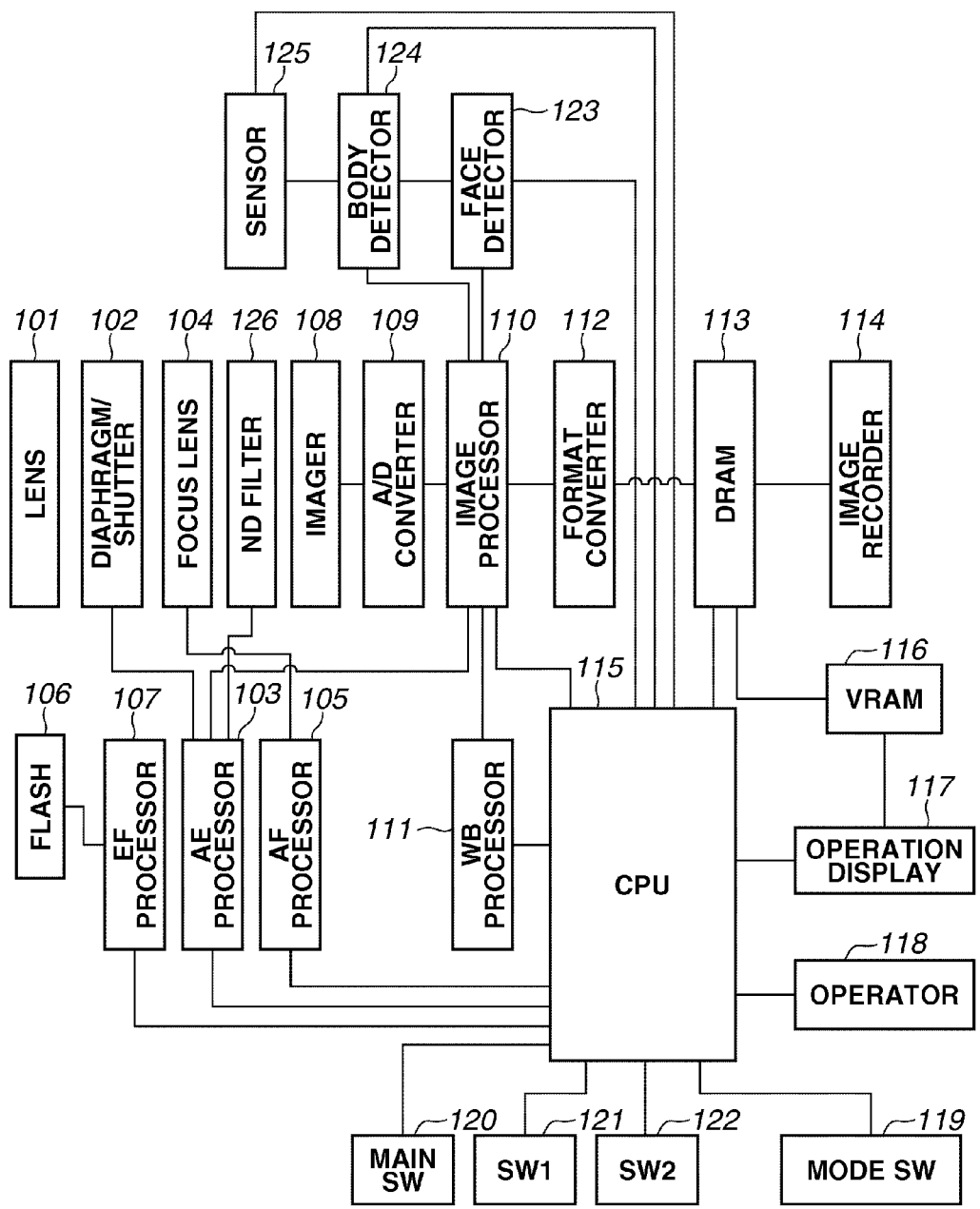
FIG. 1 is a block diagram illustrating the structure of an embodiment of an image-pickup apparatus according to the present invention.

In FIG. 1, reference numeral 101 designates an image-taking lens including a zoom mechanism. Reference numeral 102 designates a diaphragm/shutter for controlling the amount of incident light. Reference numeral 103 designates an AE processing portion including a drive portion for driving the diaphragm/shutter. Reference numeral 104 designates a focus lens for performing focusing on an image-pickup element described below. Reference numeral 105 designates an AF processing portion including a drive portion for the focus lens 104. Reference numeral 106 designates an electric flash unit. Reference numeral 107 designates an electric flash (EF) processing portion.

Reference numeral 108 designates the image-pickup element or imager for converting reflection light from an object into an electric signal. Reference numeral 109 designates an A/D converting portion including a CDS (correlated double sampling) circuit for removing noises in an output from the image-pickup element 108 and a non-linear amplifying circuit for performing process prior to the A (analog)/D (digital) conversion. Reference numeral 110 designates an image processing portion for performing process of calculating a luminance signal of the object from the output signal of the image-pickup element, and extracting a signal component in a specific frequency band of the luminance signal to acquire the focus evaluation value, and other processes. Reference numeral 111 designates a WB (white balance) processing portion. Reference numeral 112 designates a format converting portion.

Reference numeral 113 designates a high-speed built-in memory (also referred to as DRAM) such as a random access memory. The DRAM 113 can be used as a high-speed buffer memory for temporarily storing image data, or a work memory for image compression and decompression. Reference numeral 114 designates an image recording portion including a recording medium such as a memory card, and its interface. Reference numeral 115 designates a system controlling portion (CPU) for controlling the entire system in operations such as image-taking sequence. Reference numeral 116 designates a memory for image display (VRAM).

Reference numeral 117 designates an operation displaying portion for displaying not only images but also indications for assisting operations, indications showing the camera status, and indications showing the image-taking screen or image plane, and focus detecting areas at the time of image-taking.

Reference numeral 118 designates an operating portion for operating the camera from outside. The operating portion 118 includes a menu switch for various settings such as a setting of image-taking function and a setting of image replaying, a zoom lever for instructing the zoom operation of the image-taking lens, and an operation mode changing switch for changing the operation mode between an image-taking mode and a replaying mode, for example. Reference numeral 119 designates an image-taking mode switch for performing a setting of ON or OFF of the face detection mode, and the like.

Reference numeral 120 designates a main switch for turning on the electric power of the system. Reference numeral 121 designates an image-taking stand-by switch (SW1) for performing instructions for image-taking stand-by operations such as AF operation and AE operation. Upon operation of this SW1 (121), an in-focus position of the focus lens 104 for image-taking is determined. Procedures for this determination will be described below. Reference numeral 122 designates an image-taking switch (SW2) for performing instructions for image-taking subsequent to the operation of SW1.

Reference numeral 123 designates a face detection module for performing the face detection by using the image signal processed by the image processing portion 110, and supplying information (position, size and reliability) of a face or plural faces detected to the CPU 115. Reference numeral 124 designates a moving object detecting portion for detecting whether or not the object or background in the image plane is moving, and supplying the moving object information to the CPU 115. More specifically, two images arranged in time series of image signals processed by the image processing portion 110 are compared with each other, and from difference information of the comparison result, the moving object information (move amount, position and range) of the object/background is detected. Reference numeral 125 designates an angular velocity sensor for detecting the angular velocity of the camera, and supplying information of the camera motion to the CPU 115. By using the angular velocity sensor, it is also possible to detect the attitude of the camera (i.e, erected attitude or horizontal attitude). Reference numeral 126 designates an ND filter acting as a light controlling portion for reducing the amount of light input from the object. The ND filter is controlled by the AE processing portion 103, and can be removably inserted into the optical path by a driving device (not shown).

The operation of the electronic camera of this embodiment will be described with reference to the flow chart in FIG. 2. In step S201, the CPU 115 judges the state (ON/OFF) of SW1 for performing instructions for image-taking preparation. When the state is ON, the step proceeds to step S213. When the state is OFF, the state proceeds to step S202. In step S202, scene stability is judged. In step S203, the judgment of stability of the image-taking scene in step S202 is checked. When the image-taking scene is judged to be stable, the step proceeds to step S204. If not, the step returns to step S201. Here, the stable state of the image-taking scene is a state in which the object to be photographed and the camera are maintained stable so that the image-taking can be appropriately performed. For example, when the move amount of the camera detected by the angular velocity sensor 125 is below a given amount, the state of the camera can be considered to be stable.

In step S204, whether or not the object luminance is below a given value is checked. When the object luminance is below a given value, the step proceeds to step S205. If not, the step proceeds to step S206. In step S205, an AF frame setting for low luminance is performed. Here, the AF frame is an area in the image plane at which the focus evaluation value is obtained. Further, the focus evaluation value is a value that is acquired by converting the analog picture image signal read from the image-pickup element 108 into the digital signal by the A/D converting portion 109, and extracting the high frequency signal component of the luminance signal from the digital signal by the image processing portion 110. This evaluation value is stored in the CPU 115, corresponding to positions of the focus lens 104 and the AF frame. To obtain the focus evaluation value means to read the focus evaluation value stored in the CPU 115 for the purpose of judgment in the AF control by the AF processing portion 105. When the luminance is low, the exposure time is likely to lengthen. Hence, a sufficient AF precision can be hardly secured in the AF scan. Accordingly, in this embodiment, when the luminance is low, the identification or determination of the object area and the scan for the face detection are omitted, and a single AF frame with a given size is set near a central portion of the image plane.

In step S206, the CPU 115 sets a count number in a counter for measuring the number of scan times at zero (0), and stores it in the DRAM 113. In step S207, the face detection module 123 checks whether the face is detected or not. When the face is detected, the step proceeds to step S208. If not, the step proceeds to step S209. In step S208, the AF scan at the time of the face detection is performed according to procedures described below (see FIG. 3). Then, the step proceeds to step S210. In step S209, the AF scan for determining the object area is performed according to procedures described below (see FIG. 7). In step S210, the continuous AF is performed according to procedures described below (see FIG. 16).

Here, alternatively, it is possible to perform the focusing operation about the determined object area only once without performing the continuous AF, or only determine the object area. In such a case, the step succeeds to a next second scan operation.

In step S211, the scene instability judgment is performed. In step S212, whether or not the image-taking scene is judged to be instable in step S211 is checked. When the scene is judged to be instable, the step proceeds to step S201. If not, the step proceeds to step S210. Here, the instable state of the image-taking scene is a state in which the state of the object or the camera is so instable that an appropriate image-taking cannot be achieved. For example, the move amount of the camera detected by the angular velocity sensor 125 is above a given amount, or the change amount of the luminance from the previous one is above a given amount, or the face detection state (i.e, the face is detected or not) detected by the face detection module 123 changes. In such a case, it is judged that the image-taking scene changes (i.e, the scene is instable).

At the time when the state of SW1 for instructing the image-taking preparation is ON, the step proceeds from step S201 to step S213. In step S213, the focus degree judging flag is set to FALSE. In step S214, the image-taking process is executed according to procedures described below (see FIG. 17).

During the above-discussed operation, the AE processing portion 103 controls the diaphragm/shutter 102 based on the control signal from the CPU 115. Brightness of the image displayed on the operation displaying portion 117 is made appropriate by such AE operation.

Figure 2:
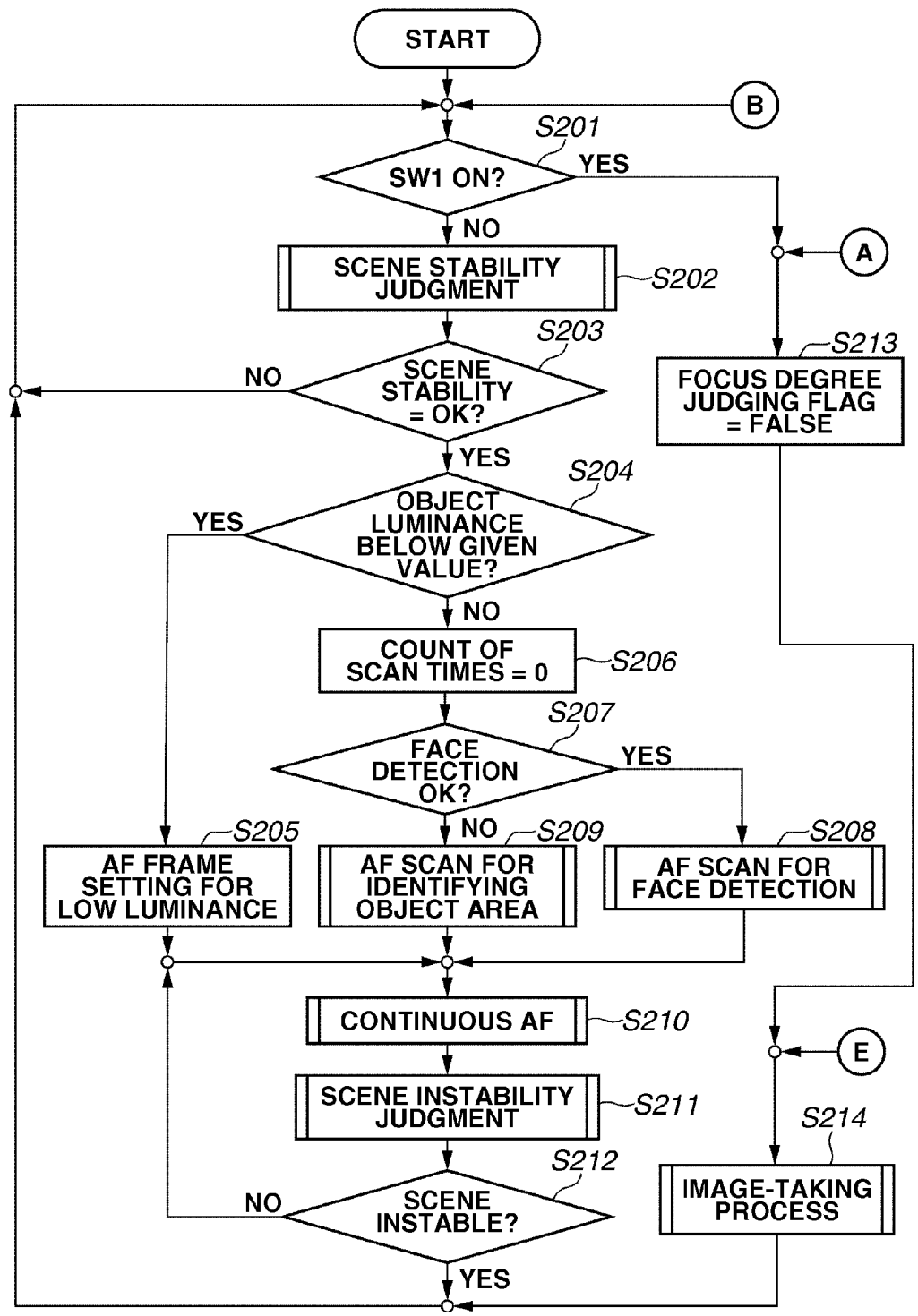
FIG. 2 is a flow chart showing the focus adjusting operation of the embodiment.
Figure 3:
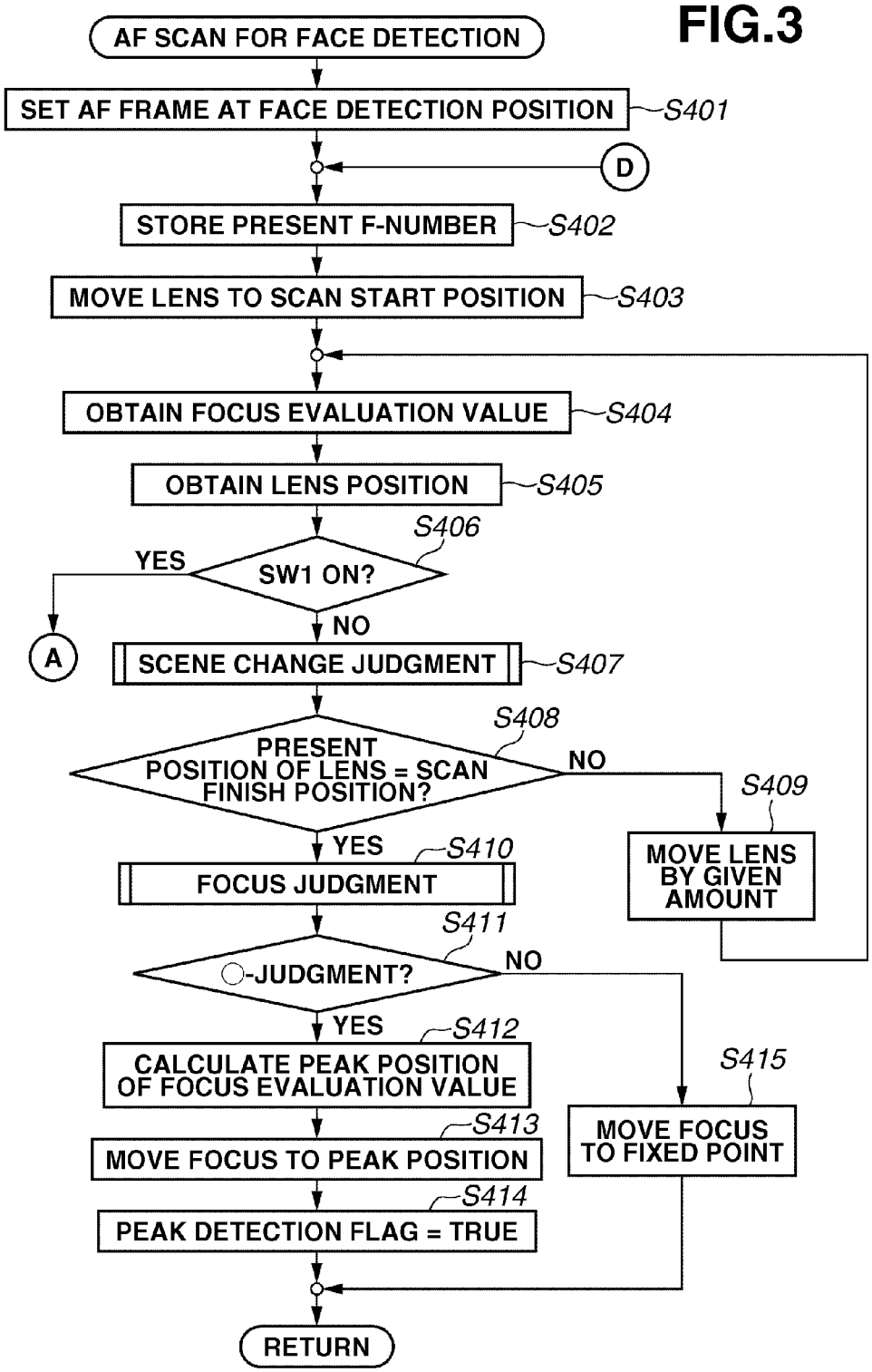
FIG. 3 is a flow chart showing a subroutine of the AF scan at the time of face detection in FIG. 2.

FIG. 3 is the flow chart of the AF scan at the time of the face detection in step S208 in FIG. 2. In step S401, the AF frame is set based on the face information (position and size) detected by the face detection module 123. In step S402, the CPU 115 acquires the present F-number of the diaphragm 102, and stores it in the DRAM 113. In step S403, the AF processing portion 105 moves the focus lens 104 to the scan start position. Here, the scan start position is determined, for example, based on the distance to an object person estimated from the face size detected. In step S404, the CPU 115 stores the focus evaluation value corresponding to the present position of the focus lens 104 in the DRAM 113. In step S405, the CPU 115 obtains data of the present position of the focus lens, and stores its data in the DRAM 113.

In step S406, the CPU 115 judges the state (ON/OFF) of SW1 for instructing the image-taking preparation. When the state is ON, the current process is finished, and the step proceeds to step S213 in FIG. 2. When the state is OFF, the step proceeds to step S407. In step S407, the scene change judgment is performed according to procedures described below (see FIG. 4). The scene change judgment is a process in which whether the image-taking scene changes or not is judged from the state of the object or the camera.

In step S408, the CPU 115 checks whether or not the present position of the focus lens 104 coincides with the scan finish position. When both are coincident, the step proceeds to step S410. If not, the step proceeds to step S409. Here, the scan finish position is determined, for example, based on the distance to the object person estimated from the face size detected. In step S409, the AF processing portion 105 moves the focus lens 104 toward the scan finish position by a given amount, and then the step returns to step S404. In step S410, the focus judgment is executed according to procedures described below (see FIG. 5).

In step S411, whether or not the focus judgment in step S410 is the o-judgment is checked. When the focus judgment is the o-judgment, the step proceeds to step S412. If not, the step proceeds to step S415. Here, the o-judgment is made when contrast of the object is sufficient and the object exists within the distance range scanned.

In step S412, the in-focus position at which the focus evaluation value obtained in step S404 is maximum is calculated. In step S413, the AF processing portion 105 moves the focus lens 104 to the in-focus position calculated in step S412. In step S414, the peak detection flag is set to TRUE. The peak detection flag is beforehand set to FALSE.

In step S415, the AF processing portion 105 moves the focus lens 104 to a position (fixed point) beforehand stored in the DRAM 113 since the judgment is not the o-judgment, that is, contrast of the object is insufficient, or the object exists outside the distance range scanned. Here, the fixed point is set to a distance at which the existing probability of the object is high. For example, where the face of a person is detected, the fixed point is a distance of the person estimated from the face size detected.

Figure 4:
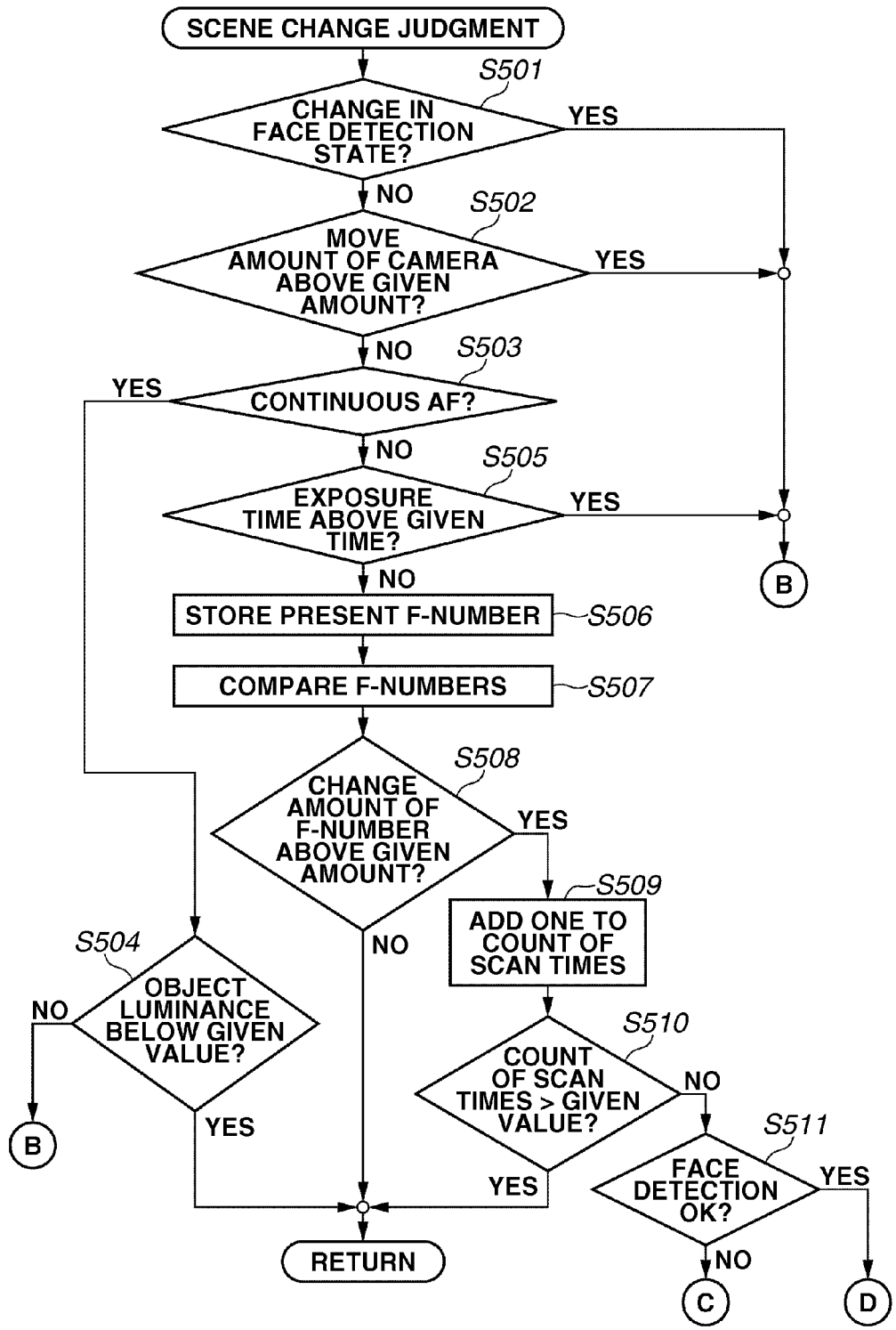
FIG. 4 is a flow chart showing a subroutine of scene change judgment in FIGS. 3, 9, 12 and 16.

FIG. 4 is the flow chart showing the scene change judgment in step S407 in FIG. 3, step S1107 in FIG. 9, step S1406 in FIG. 12, and step S2107 in FIG. 16 described below. In step S501, whether or not the face detection state detected by the face detection module 123 changes is checked. When the face detection state changes, the current judgment process is finished, and the step returns to step S201 in FIG. 2. If not, the step proceeds to step S502. Here, the face detection state is determined from whether the face is detected or not. In other words, where the face is detected at the time of the previous scene change judgment and not detected at the time of the present scene change judgment, the face detection state is judged to change.

In step S502, whether or not the move amount of the camera detected by the angular velocity sensor 125 is above a given amount is checked. When the move amount is above a given amount, the current judgment process is finished, and the step returns to S201 in FIG. 2. If not, the step proceeds to step S503.

In step S503, whether or not the continuous AF described below is presently performed is checked. When the continuous AF is performed, the step proceeds to step S504. In step S504, whether or not a difference in the object luminance is below a given value is judged. The object luminance difference is a difference between object luminance values obtained in the previous scene change judgment and the present scene change judgment. Where the difference in the object luminance value is large, the scene is judged to change. When the object luminance difference is below a given value, the current judgment process is finished. When above a given amount, the current judgment process is finished, and the step returns to step S201 in FIG. 2.

When the continuous AF is not executed, the step proceeds to step S505. In step S505, whether or not the exposure time is above a given time is checked. When the exposure time is above a given time, the current judgment process is finished, and the step returns to step S201 in FIG. 2. This is because when the exposure time is above a given time, intervals for acquisition of the focus evaluation value lengthen, so that sufficient AF precision cannot be secured. When the exposure time is not above a given time, the step proceeds to step S506.

In step S506, the CPU 115 obtains the present F-number of the diaphragm 102, and stores it in the DRAM 113. In step S507, the present F-number of the diaphragm 102 stored in step S506 is compared with the F-number of the diaphragm 102 stored in step S402 in FIG. 3, step S1101 in FIG. 9, or step S1401 in FIG. 12. In step S508, based on the comparison result in step S507, whether or not the change amount of the F-number of the diaphragm 102 is above a given amount is checked. When the change amount is above a given amount, the step proceeds to step S509. If not, the current process is finished. In this case, the given amount is set in the form of two stages, for example. The reason for comparing the present F-number of the diaphragm 102 with the F-number stored prior to the scan in steps S506 to S508 is that there is a possibility that the diaphragm value changes as a result of the AE process since the AE process is simultaneously performed while the above AF process is executed.

In step S509, one (1) is added to the count number of scan times. This count number of scan times is beforehand initialized to zero (0) in step S206 in FIG. 2. In step S510, whether or not the count number of scan times is above a given value is checked. When the count number is above a given value, the current process is finished. If not, the step proceeds to step S511. The given value at this time is three (3), for example. In step S511, whether or not the face detection module 123 detects the face is checked. When the face is detected, the current judgment process is finished, and the step proceeds to step S402 in FIG. 3. If not, the current judgment process is finished, and the step proceeds to step S809 in FIG. 7 described below.

Thus, F-numbers of the diaphragm 102 prior to the start of the AF scan and on the way of the AF scan are compared with each other, and the above first scan operation is again performed when the change amount is above a given amount. Thereby, influence of variation in the focus evaluation value caused by the diaphragm change during the first scan operation is eliminated. Further, the number of scan times is measured, so that the first scan operation would not be repeated over predetermined times. Accordingly, endless repetition of the scan can be prevented.

Figure 6:
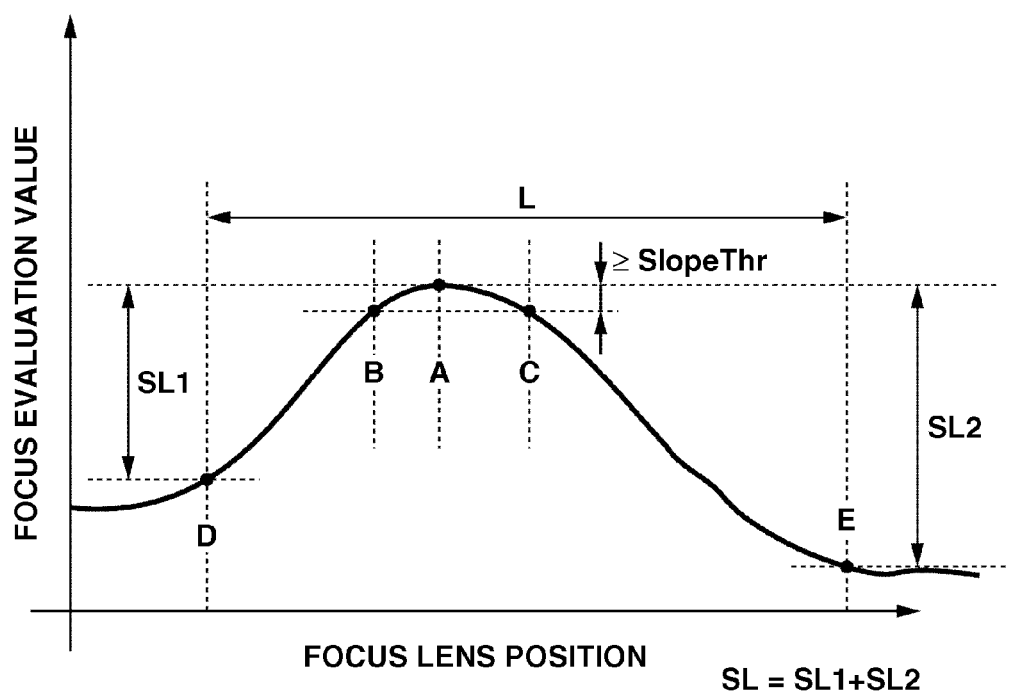
FIG. 6 is a view illustrating a manner of the focus judgment in FIG. 5.

The subroutine of focus judgment in step S410 in FIG. 3, step S1201 in FIG. 10, and step S1501 in FIG. 13 described below will be described with reference to FIGS. 5 and 6.

Where the abscissa indicates the focus lens position and the ordinate indicates the focus evaluation value, the focus evaluation value changes in the form of a hill shape as illustrated in FIG. 6, except a case where competition of far and near objects exists, and the like. Accordingly, the focus judgment can be executed by judging the hill shape from a difference between maximum and minimum focus evaluation values, a length of a slope portion whose slope has an inclination above a given value (Slope Thr), and a slope or inclination of the slope portion.

The result in the focus judgment is supplied as the following o-judgment and x-judgment.

o-judgment: Contrast of the object is sufficient, and the object exists in a distance range scanned.

x-judgment: Contrast of the object is insufficient, or the object exists outside the distance range scanned.

Further, in the x-judgment, Δ-judgment is used in a case where the object exists outside the scanned distance range on the wide-angle side.

The length L of the above slope portion and the slope SL/L of the slope portion for judging the hill shape will be described with reference to FIG. 6. SL indicates a hill height of the slope portion. Points D and E indicate points at which the slope can be deemed to continue from a hill top (point A), and L is a hill width between the points D and E. A range over which the slope can be deemed to continue is a range over which scan points with the focus evaluation value lower than that at the point A by above a given amount (Slope Thr) are successively present. The scan point is a point at which the focus evaluation value is to be obtained during continuous move of the focus lens from the scan start point to the scan finish point. The above SL is equal to SL1+SL2 where SL1 is the difference between focus evaluation values at the points A and D and SL2 is the difference between focus evaluation values at the points A and E.

Figure 5:
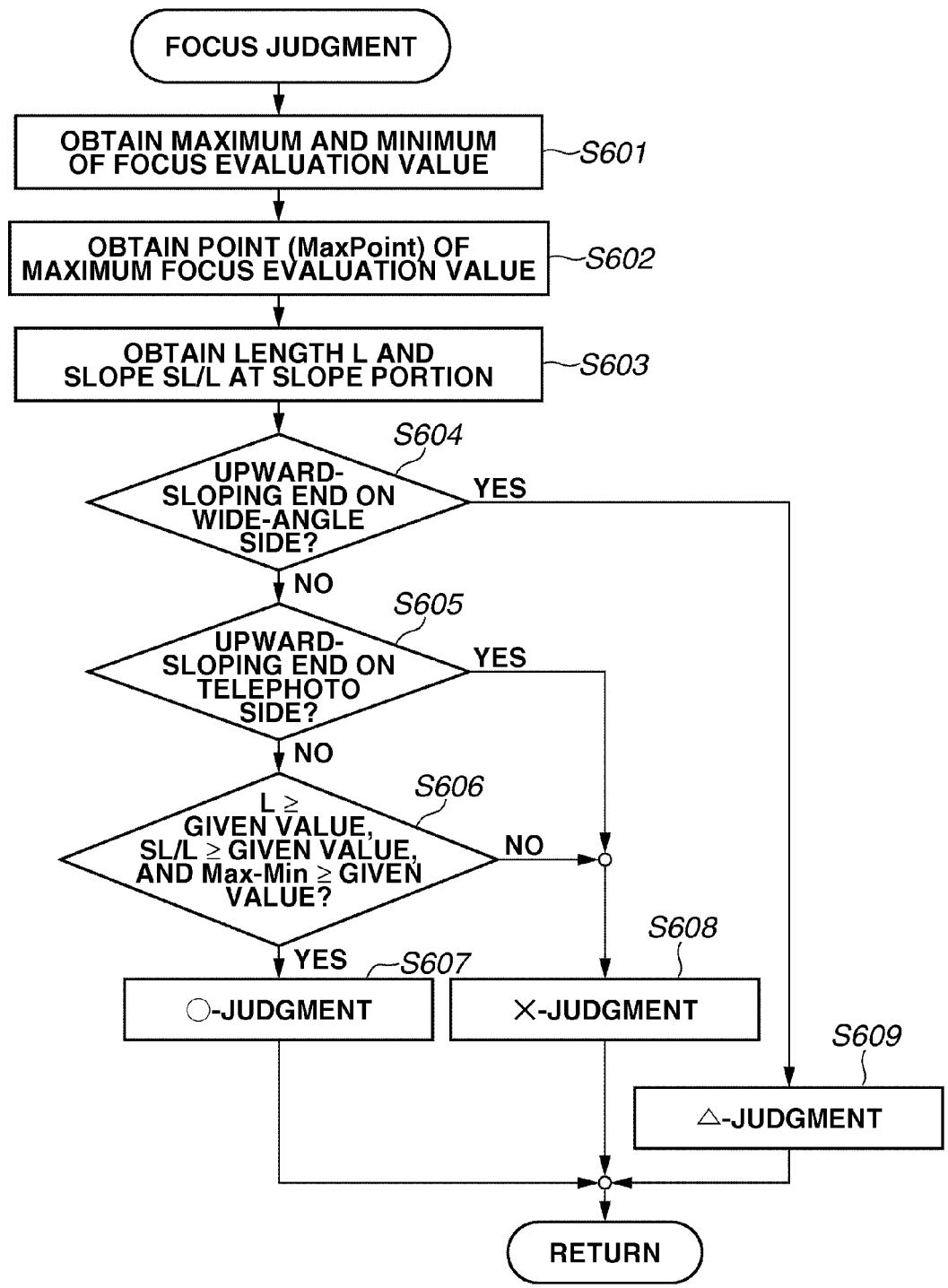
FIG. 5 is a flow chart showing a subroutine of focus judgment in FIGS. 3, 10 and 13.

In the flow chart of FIG. 5, maximum and minimum of the focus evaluation value are obtained in step S601. Then, in step S602, the scan point at which the focus evaluation value culminates is obtained, and the step proceeds to step S603. In step S603, L and SL for judgment of the hill shape are obtained from scan points and focus evaluation values, and the step proceeds to step S604.

In step S604, whether or not the hill shape has an upward-sloping end on the wide-angle side is judged. For positive judgment of the upward-sloping end on the wide-angle side, the following two conditions should be satisfied. One condition is that the scan point at which the focus evaluation value is maximum appears at the end on the wide-angle side in a given scan range. The other condition is that a difference between focus evaluation values at the scan point at the end on the wide-angle side and the scan point located one point away from the end toward the telephoto side is above a given value. When positive judgment of the upward-sloping end on the wide-angle side is made, the step proceeds to step S609. If not, the step proceeds to step S605.

In step S605, whether or not the hill shape has an upward-sloping end on the telephoto side is judged. For positive judgment of the upward-sloping end on the telephoto side, the following two conditions should be satisfied. One condition is that the scan point at which the focus evaluation value is maximum appears at the end on the telephoto side in a given scan range. The other condition is that a difference between focus evaluation values at the scan point at the end on the telephoto side and the scan point located one point away from the tend toward the wide-angle side is above a given value. When positive judgment of the upward-sloping end on the telephoto side is made, the step proceeds to step S608. If not, the step proceeds to step S606.

In step S606, in a case where the length L of the slope portion with the inclination above a given value is above a given value, the average value SL/L of the inclination of the slope portion is above a given value, and the difference between maximum (Max) and minimum (Min) focus evaluation values is above a given value, the step proceeds to step S607. If not, the step proceeds to step S608. In step S607, the result is judged to be the o-judgment, since focus evaluation values obtained have the hill shape, the object has the contrast, and the focus adjustment is possible. In step S608, the result is judged to be the x-judgment, since focus evaluation values obtained do not have the hill shape, the object does not have the contrast, and the focus adjustment is impossible. In step S609, the result is judged to be the Δ-judgment, since the upward slope toward the wide-angle side exists although focus evaluation values obtained do not have the hill shape, and there is a possibility that the peak exists on the wide-angle side. The focus judgment is thus performed.

Figure 7:
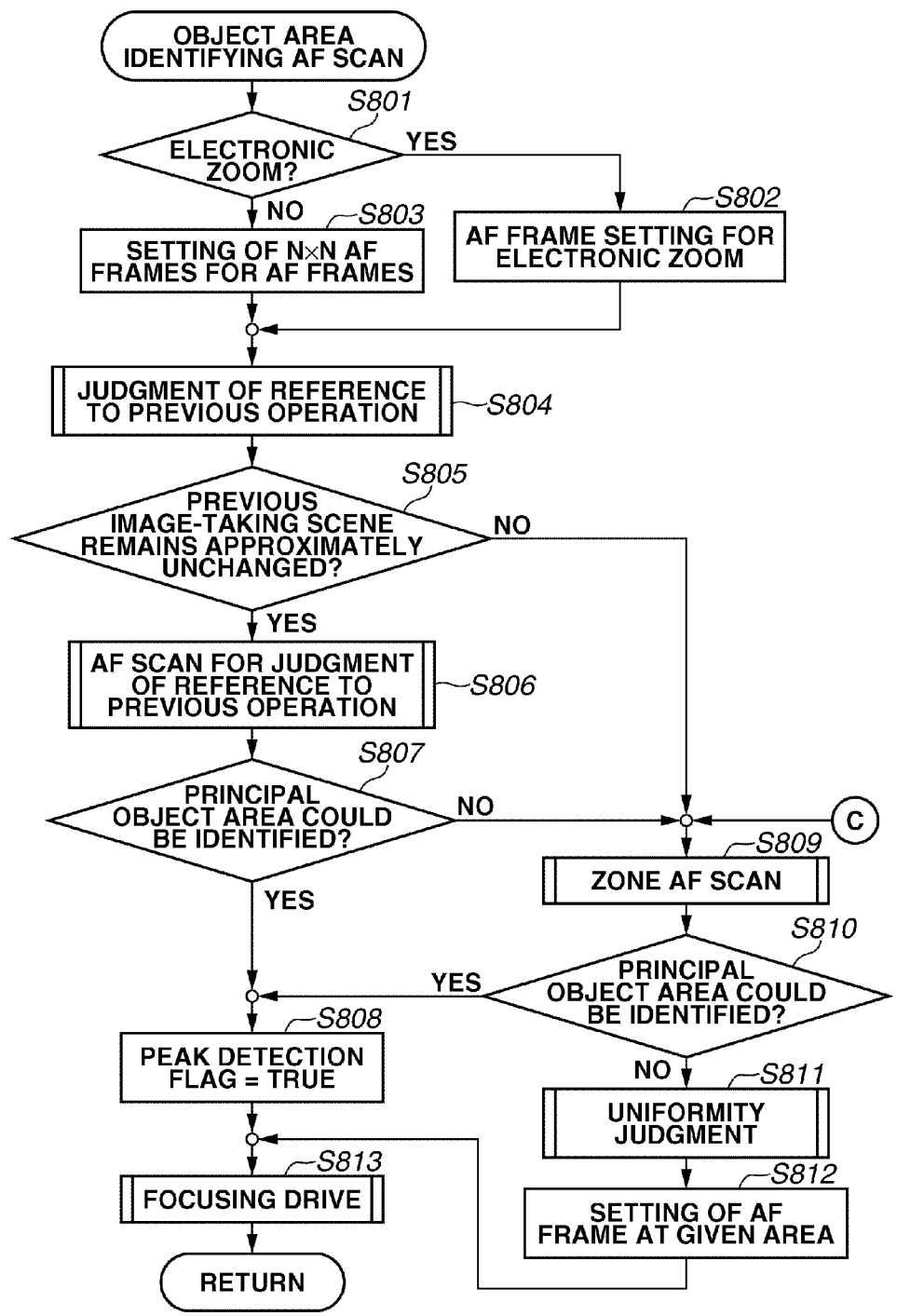
FIG. 7 is a flow chart showing a subroutine of object area identifying AF scan in FIG. 2.

FIG. 7 is the flow chart of the object area identifying or determining AF scan in step S209 in FIG. 2. Herein, the AF scan for determining a principal object area on the image plane is performed.

In step S801, whether the electronic zoom is executed or not is checked. When the electronic zoom is performed, the step proceeds to step S802. If not, the step proceeds to step S803. In step S802, the AF frame setting for the electronic zoom is performed. Here, in the electronic zoom, a central area of the image plane is expanded, and the expanded area is displayed on the operation displaying portion 117. At this time, since a narrow area on the image-pickup element 108 is expanded, the image displayed on the operation displaying portion 117 is composed of pixels whose number is smaller than that of an image at the time the electronic zoom does not executed. Accordingly, if the AF frame setting is conducted so that the frame ratio in the image displayed on the operation displaying portion 117 at the time of the electronic zoom is identical with that at the time when the electronic zoom does not executed, the pixel number in the AF frame at the former time becomes smaller than that at the latter time. Hence, a signal-to-noise ratio of the focus evaluation value decreases at the time of the electronic zoom. Therefore, AF frame settings are made different between those times.

Figure 8:
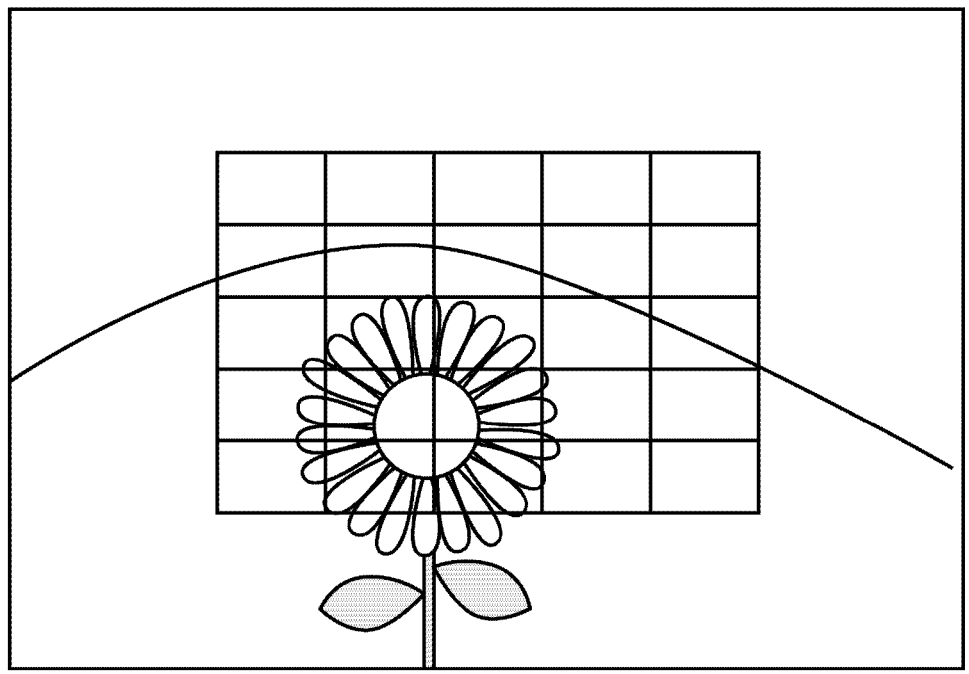
FIG. 8 is a view illustrating an example of AF frame setting in FIG. 7.

In step S803, N*N AF frames are set on the image plane. For example, where N=5 and lengths of the AF frame in horizontal and vertical directions are set to 10 percent of those of the image plane, AF frames are set as illustrated in FIG. 8. N or the AF frame size can be set considering a presence probability of the principal object in the image plane. Further, numbers of AF frames in horizontal and vertical directions can be made different from each other.

In step S804, the judgment of reference to previous operation is performed. In the judgment of reference to previous operation, to what degree the present image-taking scene changes from the image-taking scene previously AF-scanned is judged. This judgment can be executed, for example, by whether or not the object area could be determined in the previous AF scan operation, whether or not the present lens position is closer to the wide-angle end than a given position is, whether or not a time difference between previous and present AF scan operations is within a given time, or whether or not the present attitude of the camera is the same as the previous one.

In step S805, when the present image-taking scene is judged to be about the same as the previous one based on the result of the judgment of reference to previous operation in step S804, the step proceeds to step S806. If not, the step proceeds to step S809. In step S806, the AF scan for the judgment of reference to previous operation is performed according to procedures described below (see FIG. 9). In step S807, whether or not the principal object area could be identified in the AF scan for the judgment of reference to previous operation in step S806 is checked. When the principal object area could be determined, the step proceeds to step S808. If not, the step proceeds to step S809.

In step S808, the peak detection flag is set to TRUE. In step S809, the zone AF scan is performed according to procedures described below (see FIG. 12). In step S810, whether or not the principal object area could be identified in the zone AF scan in step S809 is checked. When the principal object area could be identified, the step proceeds to step S808. If not, the step proceeds to step S811. In step S811, the uniformity judgment is performed. In the uniformity judgment, examination is performed about the state of a uniform plane in which the image plane has no luminance difference, and the peak of the focus evaluation value cannot be accurately acquired due to lack of contrast even if the AF operation is conducted. In the state of the uniform plane, if the object area identifying AF scan of step S209 in FIG. 2 is repeated each time the image-taking scene becomes stable, variation in the focus state of the image plane is wastefully repeated. This repetition is cumbersome. Therefore, in the uniformity judgment flow, if the state of the uniform plane is detected, the motion of the focus lens 104 is stopped until negative judgment of the state of the uniform plane is made.

In step S812, since the principal object area is not determined in the zone AF scan of step S809, the AF frame is set to a predetermined area beforehand prepared in the image plane. This predetermined area is an area in which the principal object is likely to exist. Herein, this area is set at a central area of the image plane. In step S813, the focusing drive is executed according to procedures described below (see FIG. 15).

Figure 9:
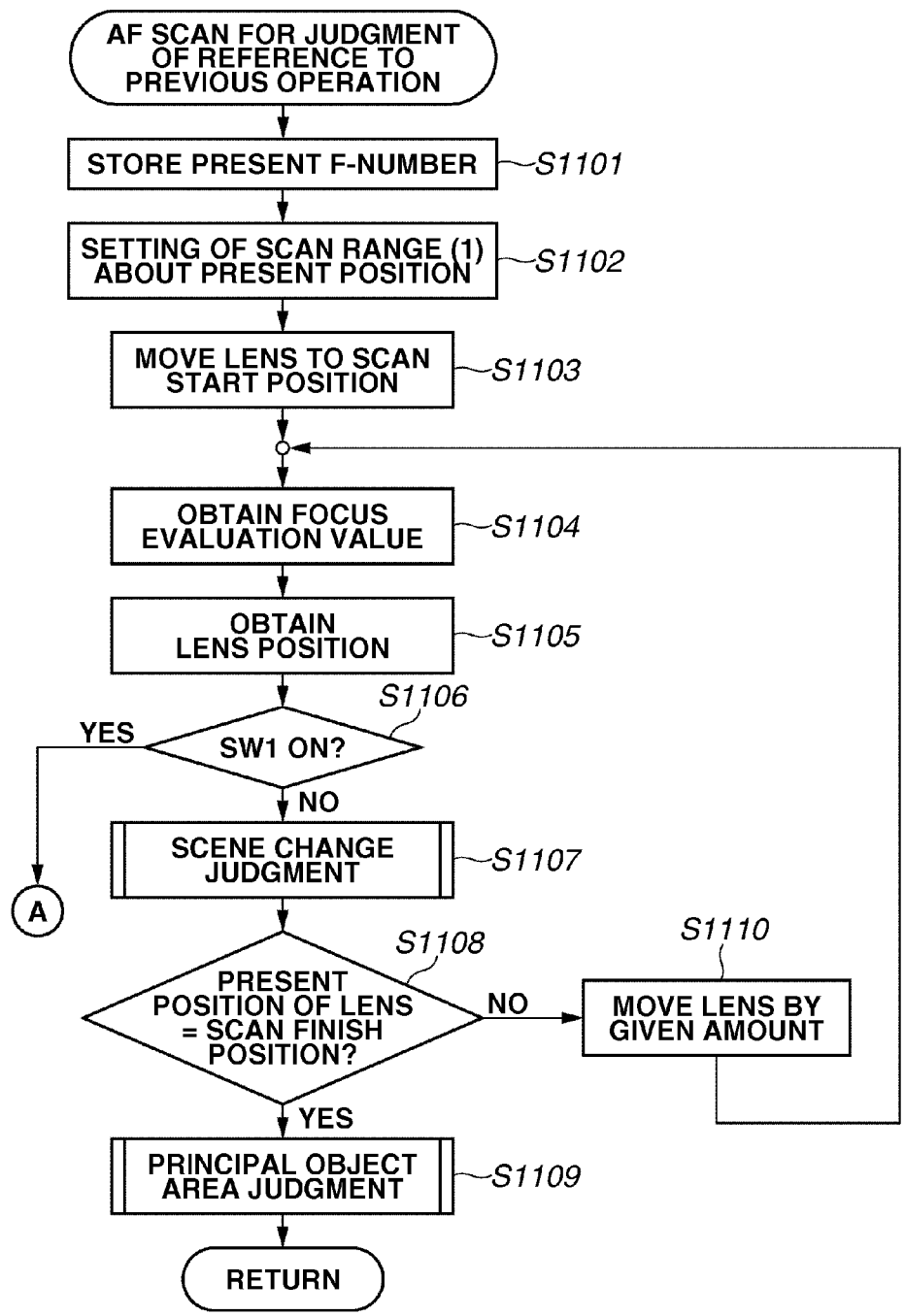
FIG. 9 is a flow chart showing a subroutine of AF scan for judgment of reference to previous operation in FIG. 7.

FIG. 9 is the flow chart of the AF scan for the judgment of reference to previous operation of step S806 in FIG. 7. In step S1101, the CPU 115 acquires the present F-number of the diaphragm 102, and stores it in the DRAM 113. In step S1102, the scan range is set to a first range about the present position of the focus lens 104. Here, since the scene is judged to be about the same as the previous image-taking scene, the first scan range is a narrow range. In step S1103, the focus lens 104 is moved to the scan start position. In step S1104, the A/D converting portion 109 converts the analog picture image signal read from the image-pickup element 108 into the digital signal, the image processing portion 110 extracts the high frequency component of the luminance signal from the digital signal, and the high frequency component is stored as the focus evaluation value by the CPU 115. In step S1105, the CPU 115 obtains the present position of the focus lens 104, and executes storage of data of this position.

In step S1106, the CPU 115 judges the state (ON/OFF) of SW1 for performing instructions for the image-taking preparation. When the state is ON, the current process is finished, and the step proceeds to step S213 in FIG. 2. When the state is OFF, the step proceeds to step S1107. In step S1107, the above scene change judgment in FIG. 4 is executed. In step S1108, the CPU 115 checks whether or not the present position of the focus lens 104 is coincident with the scan finish position. When both positions are coincident with each other, the step proceeds to step S1109. If not, the step proceeds to step S1110. In step S1109, the principal object area judgment described below is performed (see FIG. 10). In step S1110, the AF processing portion 105 moves the focus lens 104 toward the scan finish direction by a given amount, and then the step returns to step S1104.

Figure 10:
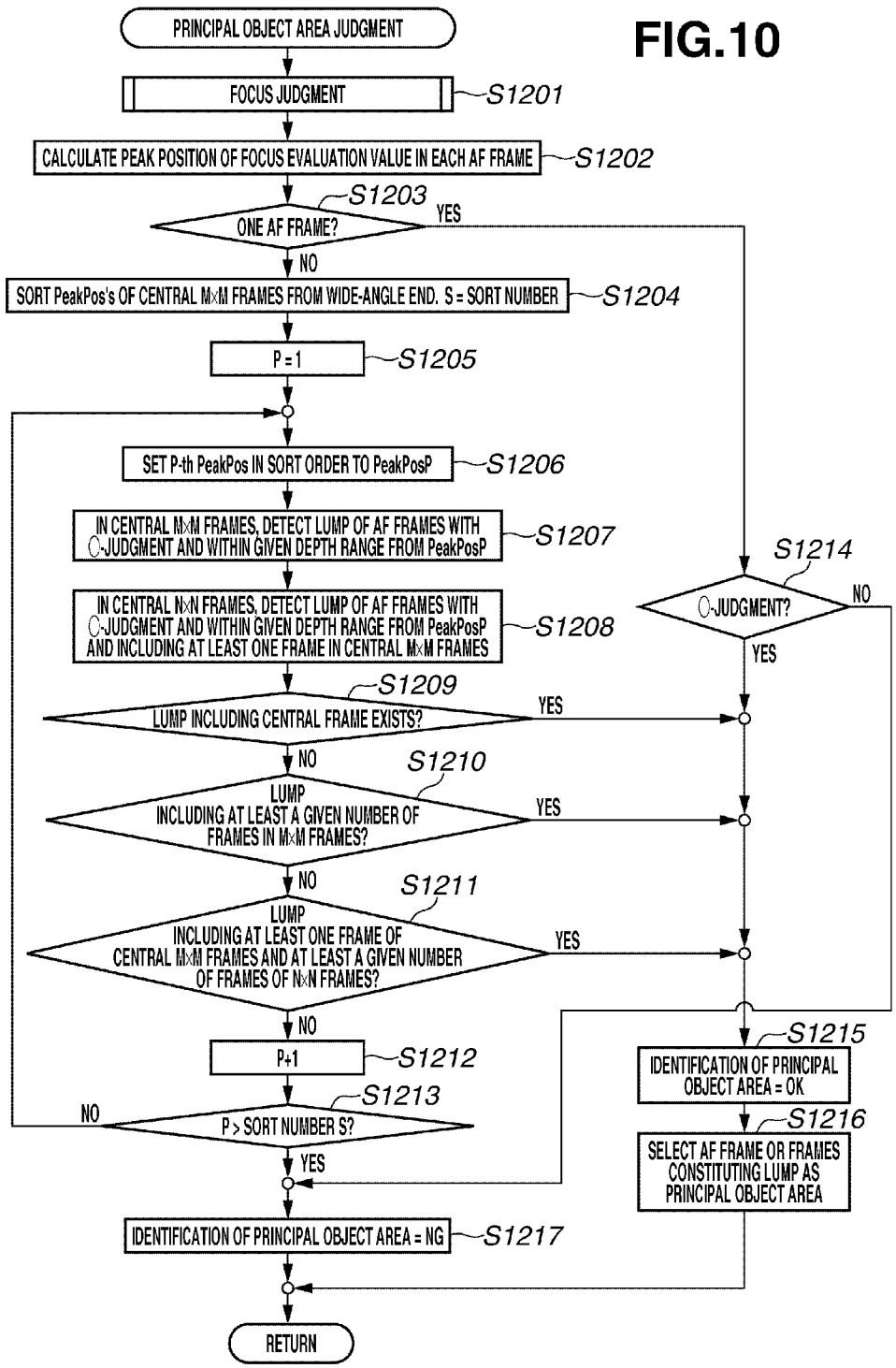
FIG. 10 is a flow chart showing a subroutine of principal object area judgment in FIG. 9.
Figure 11A:
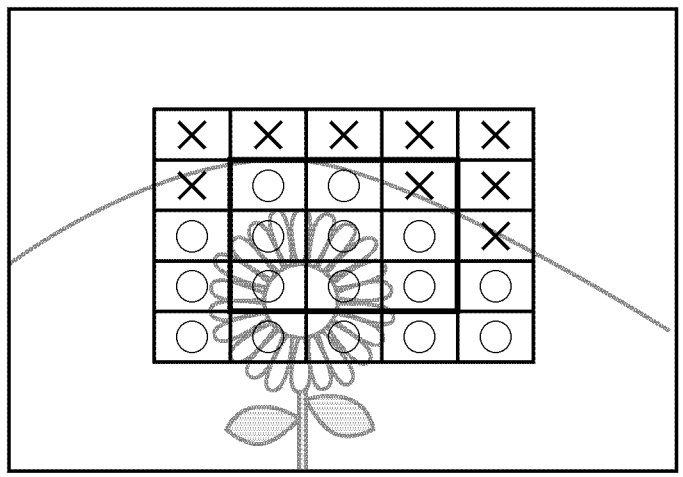
FIGS. 11A to 11C are views illustrating the principal object area judgment in FIG. 10.
Figure 11B:
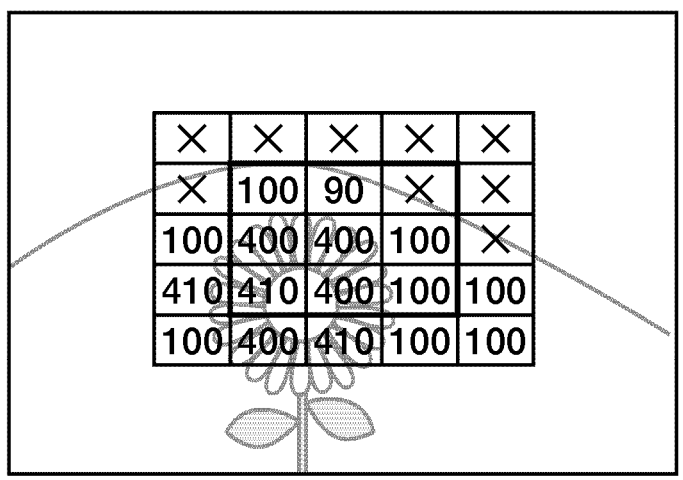
Figure 11C:
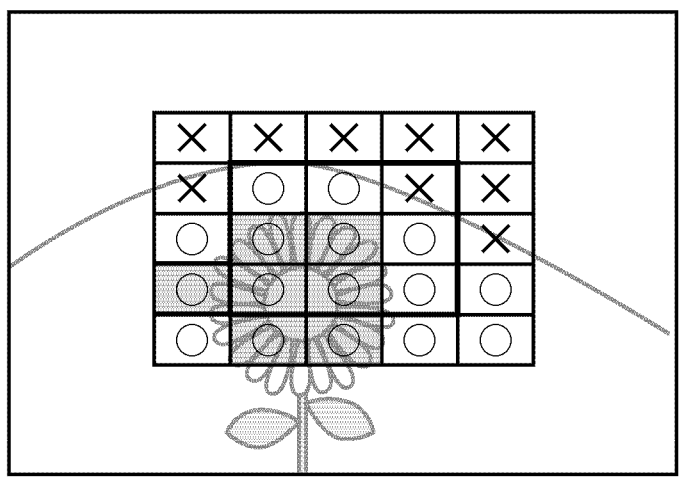

FIG. 10 is the flow chart of the principal object area judgment of step S1109 in FIG. 9 and step S1412 in FIG. 12 described below. In the principal object area judgment, whether or not the principal object area in the image plane could be determined is judged. FIGS. 11A to 11C illustrate an example of the principal object area judgment in FIG. 10. In this example, the size of the AF frame is set to 10 percent of the image plane, N=5, the scan range is set to a range from zero (0) to 500, and a given depth range is set to ±10. Here, numerals of the scan range and the given depth range are numerals for representing the position of the focus lens 104. These correspond to pulse numbers of a stepping motor (not shown) used as the driving motor for the focus lens 104, and their values increase as the focus lens 104 approaches the wide-angle end.

In step S1201, the above-described focus judgment in FIG. 5 is performed for every AF frame set. For example, in every AF frame, the focus judgment result is assumed to be one illustrated in FIG. 11A. In step S1202, the peak position (PeakPos) of the focus evaluation value in each AF frame is calculated and stored. For example, for every AF frames, the peak position calculation result is assumed to be one illustrated in FIG. 11B. In step S1203, whether or not the number of AF frames is one (1) is checked. When a single AF frame is set, the step proceeds to step S1214. If not, the step proceeds to step S1204.

In step S1204, PeakPos's of AF frames in central M*M frames are sorted from the wide-angle end. The number of sort is represented by S. In the following description, it is assumed that M=3. Nine (3*3) frames surrounded by the thick solid line in FIGS. 11A to 11C exhibit the central M*M frames. Here, the peak position of the AF frame with the x-judgment made in the focus judgment of step S1201 cannot be calculated, so that such an AF frame is excluded from AF frames to be sorted. For example, in the case of FIG. 11B, the sort result from the wide-angle end is indicated as 410, 400, 400, 400, 100, 100, 100 and 90, and the sort number S is S=8.

In step S1205, the count P for showing the order from the wide-angle end of peak positions in the M*M frames calculated in step S1202 is set to one (1). In step S1206, the P-th PeakPos in the sort order is set to PeakPosP. For example, in the case of FIG. 11B, when P=1, PeakPosP=410. In step S1207, in the central M*M AF frames, a lump of AF frames with the o-judgment and within a given depth range from the PeakPosP frame is detected, and the number and positions of AF frames constituting the lump are stored. Here, in the lump, AF frames satisfying the above conditions are adjoining to each other in horizontal and vertical directions, for example. In a case where there are plural lumps, one of them can be selected considering numbers of AF frames and positions of the respective lumps.

In step S1208, in central N*N AF frames, a lump of AF frames with the o-judgment and within a given depth range from the PeakPosP frame is detected so that at least one frame in the central M*M AF frames is involved in the above lump. And, the number and positions of AF frames constituting this lump are stored. For example, in the case of judgment results as illustrated in FIGS. 11A and 11B, the lump including frames in gray illustrated in FIG. 11C is detected.

In step S1209, whether or not the lump detected in step S1207 or S1208 includes a central frame is checked. When the lump includes the central frame, the step proceeds to step S1215. If not, the step proceeds to step S1210. In step S1210, whether or not the lump detected in step S1207 or s1208 includes at least a given number of frames in the M*M frames is checked. When the lump includes such frame or frames, the step proceeds to step S1215. If not, the step proceeds to step S1211. In step S1211, whether or not the lump detected in step S1207 or S1208 includes at least one frame of the central M*M frames and at least a given number of frame or frames of the N*N frames is checked. When the lump includes such frames, the step proceeds to step S1215. If not, the step proceeds to step S1212. In step S1212, one (1) is added to the count P. In step S1213, whether or not the count P is larger than the sort number S is checked. When the count P is larger than the sort number S, the step proceeds to step S1217. If not, the step returns to step S1206.

In step S1214, whether or not the focus judgment result in step S1201 is the o-judgment is checked. When the result is the o-judgment, the step proceeds to step S1215. If not, the step proceeds to step S1217. In step S1215, positive judgment of determination of the principal object area is made. In step S1216, AF frame or frames constituting the lump is judged to be the principal object area and selected, and the current judgment process is finished. In a case where the thus-set AF frame includes only one (1) frame, this one frame is selected. In step S1217, it is judged that the principal object area could not be determined, and the current judgment process is finished.

Figure 12:
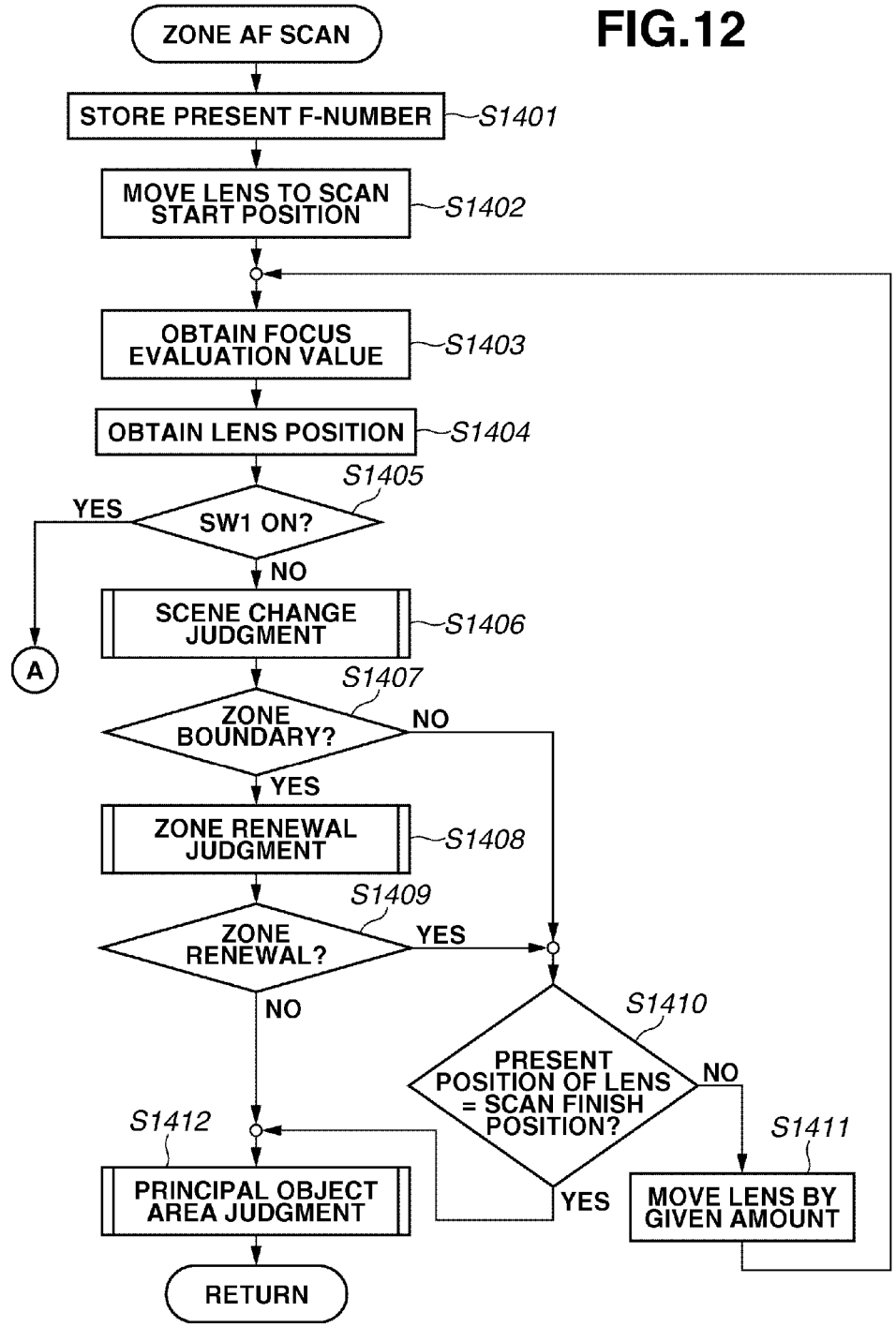
FIG. 12 is a flow chart showing a subroutine of zone AF scan in FIG. 7.

FIG. 12 is the flow chart of the zone AF scan of step S809 in FIG. 7. The zone means each range of plural ranges formed by dividing the focusable distance range.

In step S1401, the CPU 115 obtains the present F-number of the diaphragm 102, and stores it in the DRAM 113. In step S1402, the focus lens 104 is moved to the scan start position. Here, the scan start position is, for example, the position at the telephoto end. In step S1403, the A/D converting portion 109 converts the analog picture image signal read from the image-pickup element 108 into the digital signal, the image processing portion 110 extracts the high frequency component of the luminance signal from the digital signal, and the CPU 115 executes storage of the high frequency component as the focus evaluation value. In step S1404, the CPU 115 obtains the present position of the focus lens 104, and executes storage of data of this position.

In step S1405, the CPU 115 judges the state (ON/OFF) of SW1 for performing instructions for the image-taking preparation. When the state is ON, the current process is finished, and the step proceeds to step S213 in FIG. 2. When the state is OFF, the step proceeds to step S1406. In step S1406, the above scene change judgment in FIG. 4 is executed. In step S1407, the CPU 115 checks whether or not the present position of the focus lens 104 is coincident with the boundary position of the zone beforehand set. When both positions are coincident with each other, the step proceeds to step S1408. If not, the step proceeds to step S1410. In step S1408, the zone renewal judgment is performed according to procedures described below (see FIG. 13). Here, the zone renewal means to scan a new zone subsequent to the scan of a zone adjoining the new zone.

In step S1409, whether or not the zone renewal is decided to be performed is checked based on the judgment result in step S1408. When the zone renewal is decided to be performed, the step proceeds to step S1410. If not, the step proceeds to step S1412. In step S1410, the CPU 115 checks whether or not the present position of the focus lens 104 is coincident with the scan finish position. When both positions are coincident with each other, the step proceeds to step S1412. If not, the step proceeds to step S1411. In step S1411, the focus lens 104 is moved toward the scan finish direction by a given amount, and then the step returns to step S1403. In step S1412, the above principal object area judgment in FIG. 10 is performed.

Figure 13:
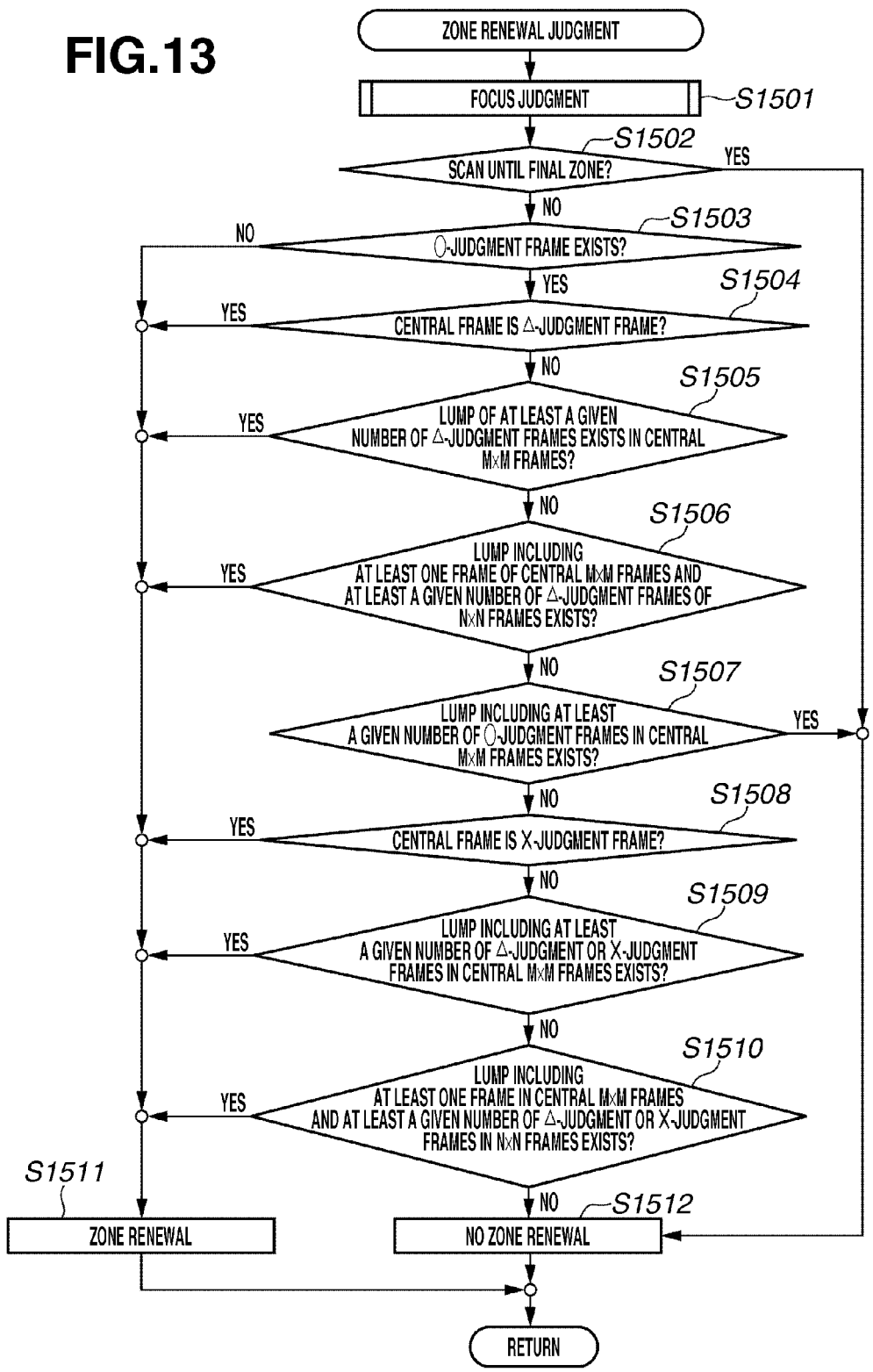
FIG. 13 is a flow chart showing a subroutine of zone renewal judgment in FIG. 12.
Figure 14A:
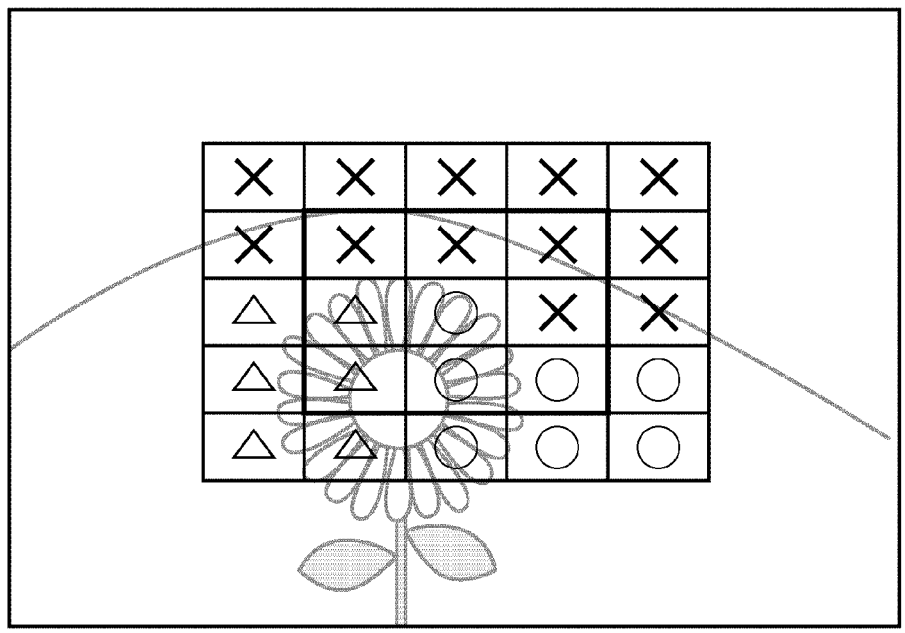
FIGS. 14A and 14B are views illustrating an example of the zone renewal judgment in FIG. 13.
Figure 14B:
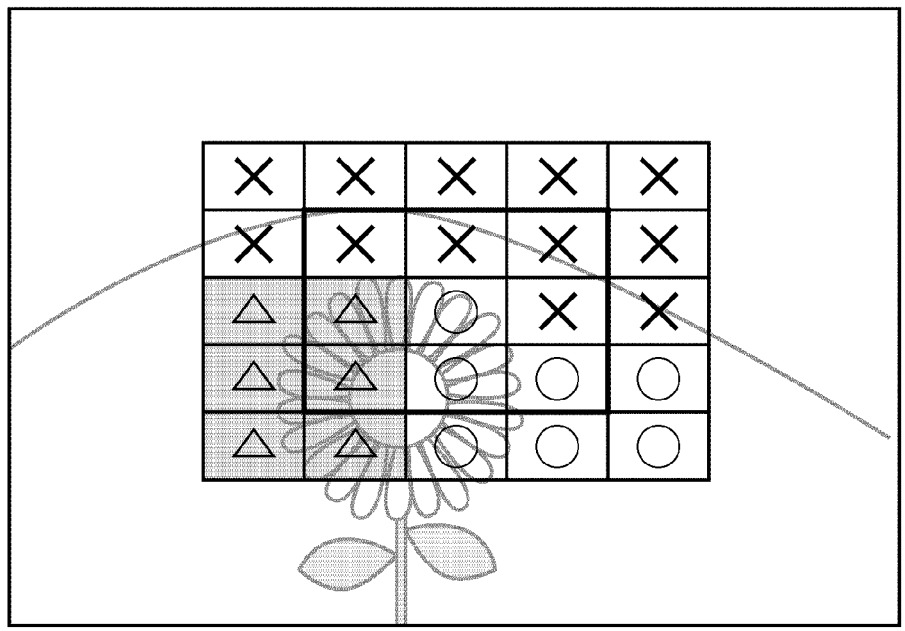

FIG. 13 is the flow chart of the zone renewal judgment of step S1408 in FIG. 12. In the zone renewal judgment, whether or not the principal object exists in a position forward in the scan direction is judged. That is, whether or not the AF scan is to be continued is judged. FIGS. 14A and 14B illustrate an example of the zone renewal judgment in FIG. 13. In this example, the size of the AF frame is set to ten (10) percent of the image plane, N=5 and M=3.

In step S1501, the above focus judgment in FIG. 5 is performed for every AF frame set. For example, the focus judgment result as illustrated in FIG. 14A is assumed to be obtained in every AF frame. In step S1502, whether or not the scan is performed onward to the final zone is checked. When the scan is performed until the final zone, the step proceeds to step S1512. If not, the step proceeds to step S1503. In step S1503, whether or not the o-judgment frame exists is checked. When the o-judgment frame exists, the step proceeds to step S1504. If not, the step proceeds to step S1511.

In step S1504, whether or not the judgment of the central frame is the Δ-judgment is checked. When the judgment of the central frame is the Δ-judgment, the step proceeds to step S1511. If not, the step proceeds to step S1505. In step S1505, whether or not a lump of at least a given number of Δ-judgment frames exists in the central M*M frames is checked. When the lump exists, the step proceeds to step S1511. If not, the step proceeds to step S1506. In the example of FIGS. 14A and 14B, this given number is set to two (2). In step S1506, whether or not a lump including at least one frame of the central M*M frames and at least a given number of Δ-judgment frame or frames of the N*N frames exists is checked. When such a lump exists, the step proceeds to step S1511. If not, the step proceeds to step S1507. In the example of FIGS. 14A and 14B, this given number is set to four (4). In step S1507, whether or not a lump including at least a given number of o-judgment frame or frames in the central M*M frames exists is checked. When such a lump exists, the step proceeds to step S1512. If not, the step proceeds to step S1508. In the example of FIGS. 14A and 14B, this given number is five (5).

In step S1508, whether or not the central frame is the x-judgment frame is checked. When the central frame is the x-judgment frame, the step proceeds to step S1511. If not, the step proceeds to step S1509. In step S1509, whether or not a lump including at least a given number of Δ-judgment or x-judgment frame or frames in the central M*M frames exists is checked. When such a lump exists, the step proceeds to step S1511. If not, the step proceeds to step S1510. In the example of FIGS. 14A and 14B, this given number is set to two (2). In step S1510, whether or not the lump including at least one frame in the central M*M frames and at least a given number of Δ-judgment or x-judgment frame or frames in the N*N frames exists is checked. When such a lump exists, the step proceeds to step S1511. If not, the step proceeds to step S1512. In the example of FIGS. 14A and 14B, this given number is four (4). In step S1511, it is judged that the zone renewal is to be performed, and the current judgment process is finished. In step S1512, it is judged that the zone renewal is not to be performed, and the current judgment process is finished.

For example, in the case of N=5 and M=3, the lump is an area illustrated in gray in FIG. 14B, and it is judged that the zone renewal is to be performed.

Figure 15:
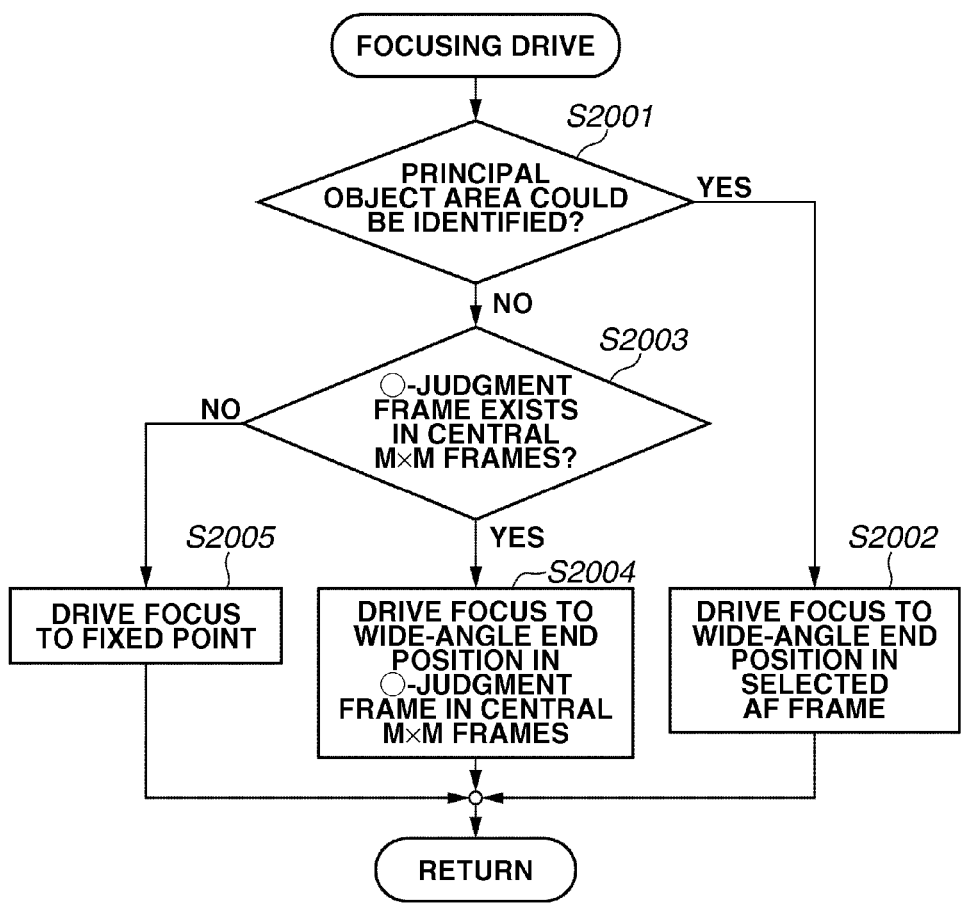
FIG. 15 is a flow chart showing a subroutine of focusing drive in FIG. 7.

FIG. 15 is the flow chart of the focusing drive of step S813 in FIG. 7. In step S2001, whether or not the principal object area could be identified is checked. When the principal object area could be determined, the step proceeds to step S2002. If not, the step proceeds to step S2003. In step S2002, the focus is driven to the wide-angle end position in the selected AF frame, and the current process is finished. In step S2003, whether or not the o-judgment frame exists in the central M*M frames is checked. When the o-judgment frame exists, the step proceeds to step S2004. If not, the step proceeds to step S2005. In step S2004, the focus is driven to the wide-angle end position in the o-judgment frame in the central M*M frames, and the current process is finished. In step S2005, the focus lens is driven to the position (fixed point) beforehand stored, and the current process is finished. Here, the fixed point is, for example, a distance position with a high existing probability of the object.

Figure 16:
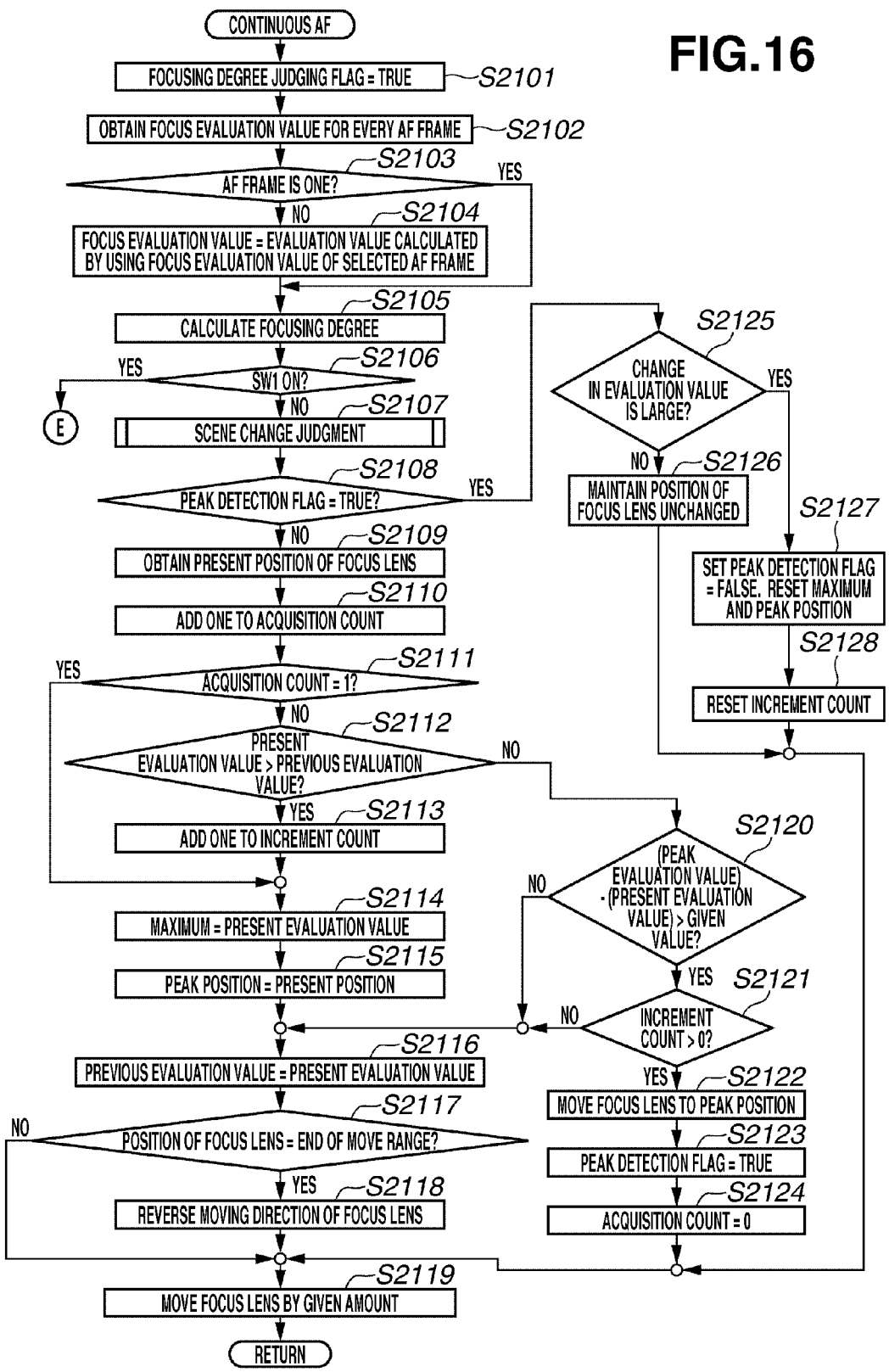
FIG. 16 is a flow chart showing a subroutine of continuous AF in FIG. 2.

FIG. 16 is the flow chart of the continuous AF of step S210 in FIG. 2. In step S2101, the focusing degree judging flag is set to TRUE. In step S2102, the focus evaluation value is obtained for every AF frame set.

In step S2103, whether or not the number of AF frames set is one (1) is checked. When the AF frame is one, the step proceeds to step S2105. If not, the step proceeds to step S2104. In step S2104, the evaluation value calculated by using the focus evaluation value of the AF frame selected as the principal object area is re-set as the focus evaluation value to be used in step S2105 onward. Thereby, even if the image-taking scene changes and the principal object area in the image plane changes, the focus evaluation value of the principal object area in the image plane can be calculated.

In step S2105, the focusing degree is calculated based on the focus evaluation value. In this embodiment, based on the focus evaluation value, the focusing degree is classified into high, medium and low degrees. In step S2106, the CPU 115 judges the state (ON/OFF) of SW1 for performing instructions for image-taking preparation. When the state is ON, the current process is finished, and the step proceeds to step S213 in FIG. 2. When the state is OFF, the step proceeds to step S2107. In step S2107, the above scene change judgment in FIG. 4 is performed.

In step S2108, whether or not the peak detection flag is TRUE is checked. When TRUE, the step proceeds to step S2125. When FALSE, the step proceeds to step S2109. In step S2109, the present position of the focus lens 104 is acquired. In step S2110, one (1) is added to the acquisition count for counting acquisitions of the focus evaluation value and the present position of the focus lens 104. This count is beforehand set to zero (0) in an initializing operation. In step S2111, whether or not the value of the acquisition count is one (1) is checked. When this value is one, the step proceeds to step S2114. If not, the step proceeds to step S2112.

In step S2112, whether or not the present focus evaluation value is larger than the previous focus evaluation value is checked. When the former is larger than the latter, the step proceeds to step S2113. If not, the step proceeds to step S2120. In step S2113, one (1) is added to the increment count. In step S2114, the present focus evaluation value is set as the maximum of the focus evaluation value, and stored in an operational memory (not shown) built in the CPU 115. In step S2115, the present position of the focus lens 104 is set as the position corresponding to the peak of the focus evaluation value, and stored in the operational memory built in the CPU 115. In step S2116, the present focus evaluation value is set as the previous focus evaluation value, and stored in the operational memory built in the CPU 115. In step S2117, whether or not the present position of the focus lens 104 is at the end of the focus lens move range is checked. When the present position is at the end, the step proceeds to step S2118. If not, the step proceeds to step S2119. In step S2118, the moving direction of the focus lens 104 is reversed. In step S2119, the focus lens 104 is moved by a given amount.

In step S2120, whether or not "(maximum of focus evaluation value)−(present focus evaluation value)" is larger than a given value is checked. When this difference is larger than a given value, the step proceeds to step S2121. If not, the step proceeds to step S2116. Here, if this difference is larger than a given value, i.e, the present focus evaluation value is smaller than the maximum value by more than a given value, the maximum value is deemed as the value corresponding to the focus peak position. In step S2121, whether or not the increment count is larger than zero (0) is checked. When the increment count is larger than zero, the step proceeds to step S2122. If not, the step proceeds to step S2116. In step S2122, the focus lens 104 is moved to the peak position corresponding to the maximum of the focus evaluation value stored in step S2115. In step S2123, the peak detection flag is set to TRUE. In step S2124, the acquisition count is set to zero (0).

In step S2125, whether or not the present focus evaluation value changes from the maximum of the focus evaluation value by above a given ratio is checked. When the present focus evaluation value changes by above a given ratio, the step proceeds to step S2127. If not, the step proceeds to step S2126. In step S2126, the position of the focus lens 104 is maintained unchanged. In step S2127, in order to seek again the position of the focus lens at which the focus evaluation value becomes maximum, the peak detection flag is set to FALSE, and the maximum of the focus evaluation value and the peak position are reset. In step S2128, the increment count is reset.

As described above, in the continuous AF operation, the focus lens is driven so that the principal object is kept in the in-focus state.

Figure 17:
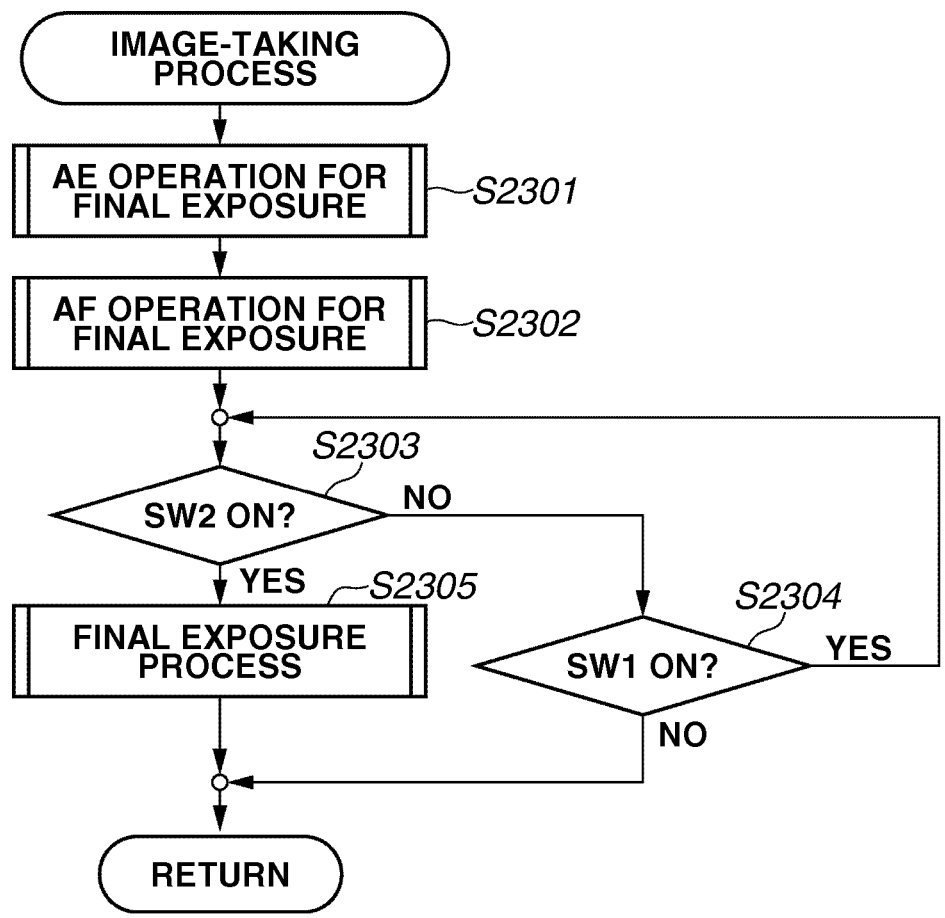
FIG. 17 is a flow chart showing a subroutine of image-taking process in FIG. 2.

FIG. 17 is the flow chart of the image-taking process of step S214 in FIG. 2. In step S2301, the AE process for final exposure is performed according to procedures described below (see FIG. 20). In step S2302, the AF operation for final exposure is performed according to procedures described below (see FIG. 18). In step S2303, the CPU 115 judges the state (ON/OFF) of the image-taking switch SW2 (122). When the state is ON, the step proceeds to step S2305. When the state is OFF, the step proceeds to step S2304. In step S2304, the state (ON/OFF) of SW1 for performing instructions for image-taking preparation is judged. When the state is ON, the step proceeds to step S2303. When the state is OFF, the current process is finished. In step S2305, the final exposure process is performed according to procedures described below (see FIG. 19), and the current process is finished.

Figure 20:
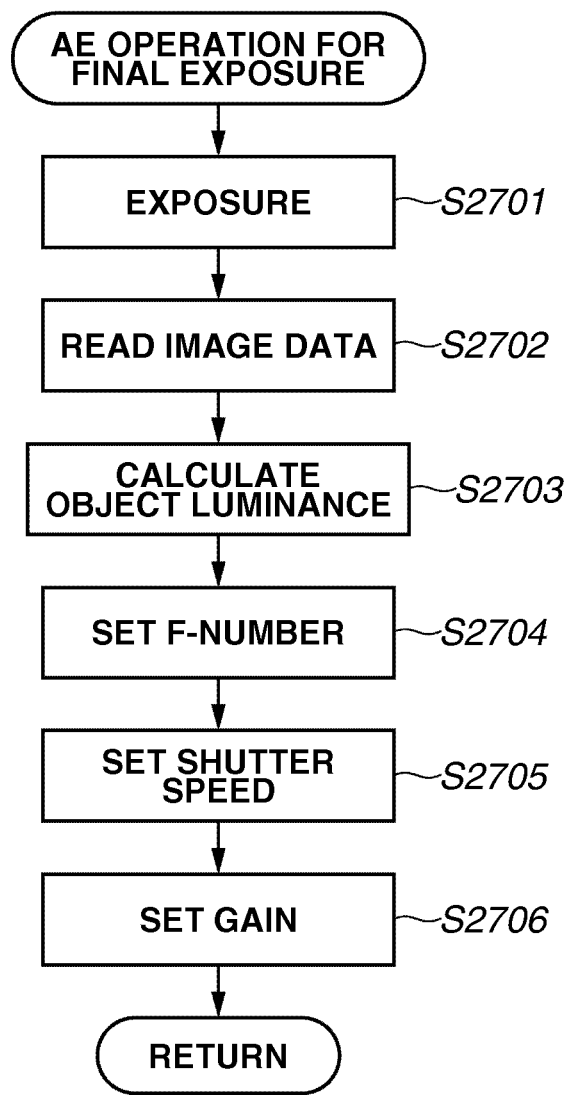
FIG. 20 is a flow chart showing a subroutine of AE operation for final exposure in FIG. 17.

FIG. 20 is the flow chart of the AE operation for final exposure of step S2301 in FIG. 17. In step S2701, the image-pickup element 108 is exposed. In step S2702, image data is read from the image-pickup element 108. In step S2703, the object luminance is calculated from image data read in step S2702. In step S2704, the F-number of the diaphragm 102 is determined based on the object luminance calculated in step S2703, and a diaphragm driving device (not shown) is controlled to establish this F-number. In step s2705, the shutter speed is set based on the object luminance calculated in step S2703. In step S2706, the gain for multiplying the luminance level of image data by a given number is set based on the object luminance calculated in step S2703.

Figure 18:
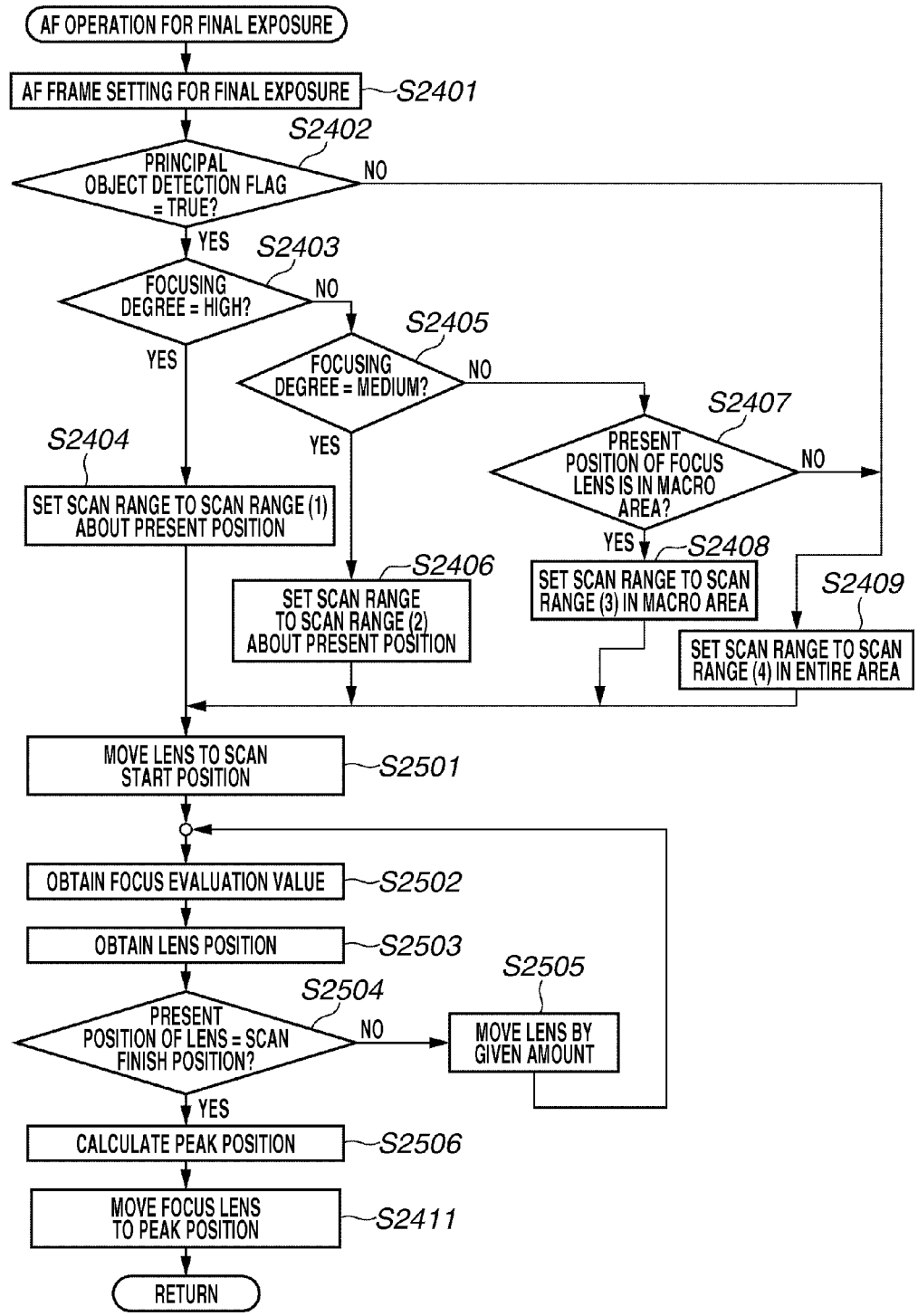
FIG. 18 is a flow chart showing a subroutine of AF operation for final exposure in FIG. 17.

FIG. 18 is the flow chart of the AF operation for final exposure of step S2302 in FIG. 17. In step S2401, the AF frame setting for final exposure is performed. In step S2402, whether or not the principal object detection flag is TRUE is checked. When the flag is TRUE, the step proceeds to step S2403. If not, the step proceeds to step S2409. In step S2403, whether or not the focusing degree calculated in step S2105 in FIG. 16 is high is checked. When the focusing degree is high, the step proceeds to step S2404. If not, the step proceeds to step S2405.

In step S2404, the scan range is set to the first range (1) about the present position of the focus lens 104. Here, it is judged that the principal object is approximately in the in-focus state due to the continuous AF operation, i.e, the position of the focus lens is close to the in-focus position corresponding to the peak of the focus evaluation value, and a narrow scan range is set. In step S2405, whether or not the focusing degree calculated in step S2105 is medium is checked. When the focusing degree is medium, the step proceeds to step S2406. If not, the step proceeds to step S2407. In step S2406, the scan range is set to the second range (2) about the present position of the focus lens 104. Here, it is judged that the focusing degree is not so high though the position of the focus lens is near the in-focus position due to the continuous AF operation, and the scan range is set to a narrow range wider than the first scan range. In step S2407, whether or not the present position of the focus lens 104 is in a macro zone is checked. When the present position is in the macro zone, the step proceeds to step S2408. If not, the step proceeds to step S2409. In step S2408, the scan range is set to the beforehand-stored third range (3) in the macro zone. In step S2409, the scan range is set to the beforehand-stored fourth range (4) that is the entire focus detectable range.

In step S2501, the focus lens 104 is moved to the scan start position. The scan start position is assumed to be the end position of the scan range set in step S2404, S2406, S2408 or S2409. In step S2502, the A/D converting portion 109 converts the analog picture image signal read from the image-pickup element 108 into the digital signal, the image processing portion 110 extracts the high frequency component of the luminance signal from the digital signal, and the CPU 115 executes storage of the high frequency component as the focus evaluation value. In step S2503, the CPU 115 obtains the present position of the focus lens 104, and executes storage of data of this position. In step S2504, the CPU 115 checks whether or not the present position of the focus lens 104 is coincident with the scan finish position. When both positions are coincident, the step proceeds to step S2506. If not, the step proceeds to step S2505. In step S2505, the AF processing portion 105 moves the focus lens 104 toward the scan finish direction by a given amount, and then the step returns to step S2502. In step S2506, the peak position of the focus evaluation value is calculated from the focus evaluation value and its lens position stored in step S2502. And, in step S2411, the focus lens 104 is moved to the peak position calculated in step S2506.

As described with reference to FIGS. 17, 18 and 20, since the AF operation for final exposure is performed after the diaphragm 102 is set in the AE operation for final exposure, the diaphragm 102 is not changed in the AF operation for final exposure. Therefore, there is no influence of the change in the diaphragm, so that there is no need to perform the AF scan over again.

Figure 19:
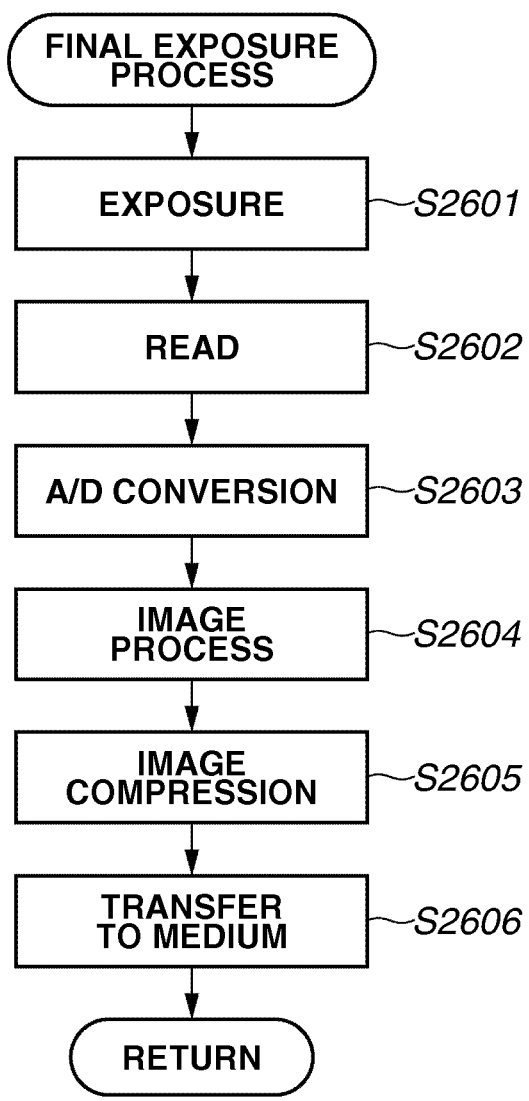
FIG. 19 is a flow chart showing a subroutine of final exposure process in FIG. 17.

FIG. 19 is the flow chart of the final exposure process of step S2305 in FIG. 17. After the exposure of the image-pickup element 108 in step S2601, data accumulated in the image-pickup element 108 is read in step S2602. In step S2603, the A/D converting portion 109 converts the analog signal read from the image-pickup element 108 into the digital signal. In step S2604, the image processing portion 110 executes various kinds of image processes to the digital signal output from the A/D converting portion 109. In step S2605, the image processed in step S2604 is compressed according to a format, such as JPEG, under the control of the CPU 115. In step S2606, data compressed in step S2605 is supplied to the image recording portion 114 and recorded therein under the control of the CPU 115.

As described above, in the first embodiment, in AF scans for the face detection and the object area determination prior to push of SW1 acting as a means for instruction of decision of the focus state, the scan is performed again if the change in the F-number of the diaphragm 102 during the scan is larger than a given amount. Thereby, influence of variation in the focus evaluation value caused by the diaphragm change during the first scan operation can be eliminated. Further, since the number of scan times is counted so that the scan is not repeated over a given number of times, endless repetition of the scan can be prevented. Furthermore, since the AF operation for final exposure is performed after the diaphragm 102 is set in the AE operation for final exposure, as illustrated in FIG. 17, the diaphragm 102 is not changed during the AF operation for final exposure including the second scan operation. Therefore, influence of the diaphragm change is eliminated, so that there is no need to perform the AF scan over again.

A second embodiment will be described. In the first embodiment, in AF scans for the face detection and the object area identification prior to push of SW1 (121), the scan is performed again if the change in the F-number of the diaphragm 102 during the scan is larger than a given amount. Instead of such operation, in the second embodiment, the scan is performed again if the state of the ND filter is changed. The operation of the second embodiment will be described.

Figure 21:
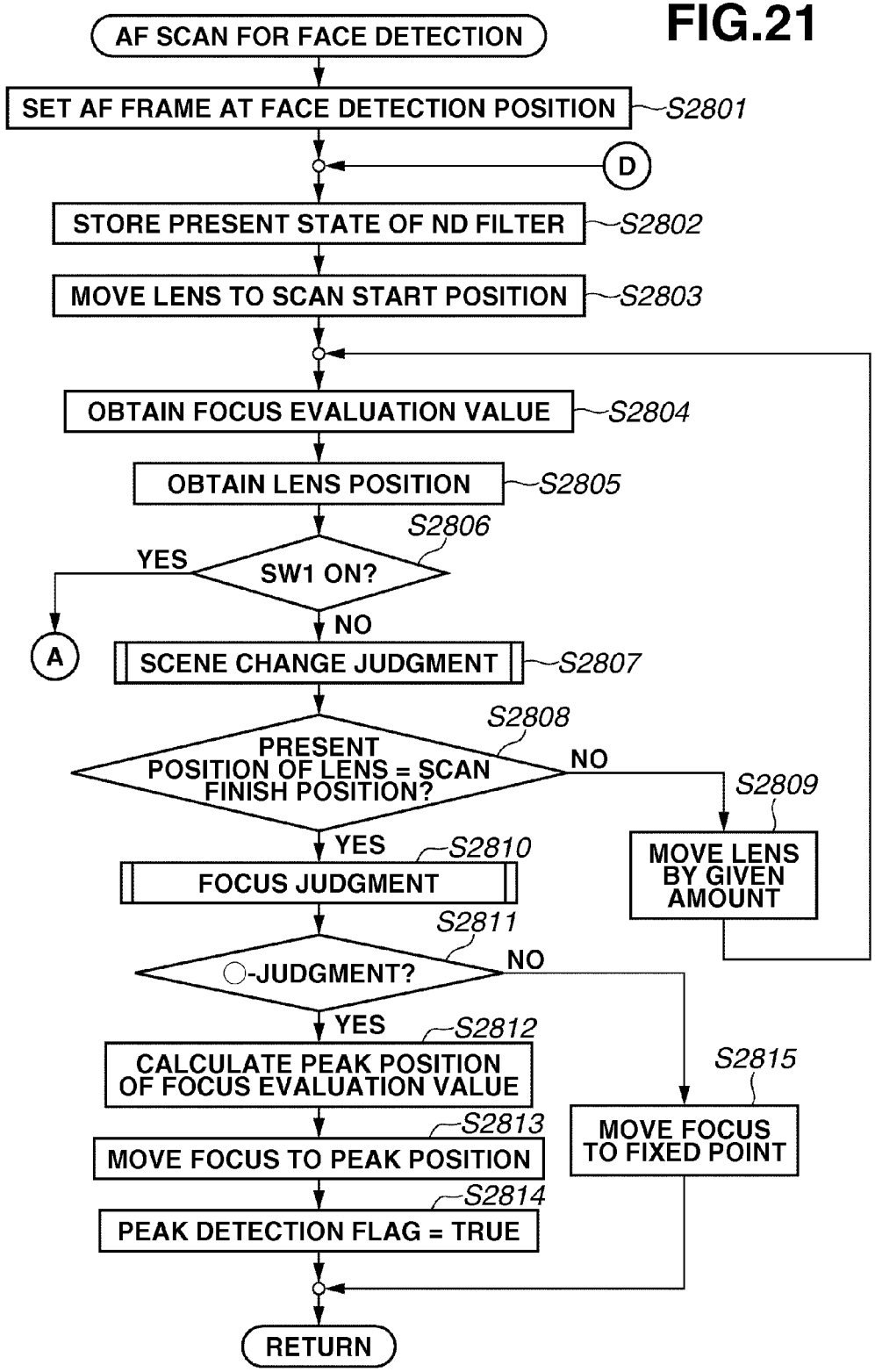
FIG. 21 is a flow chart showing a subroutine of AF scan at the time of face detection in a second embodiment.

FIG. 21 is the flow chart of the AF scan at the time of the face detection in the second embodiment, which corresponds to the AF scan in FIG. 3 of the first embodiment. In step S2801, the AF frame is set based on the face information (position and size) detected by the face detection module 123. In step S2802, the CPU 115 acquires the present state of the ND filter 126, and stores it in the DRAM 113. The state of the ND filter means if the ND filter is inserted into or removed from the optical path. Steps from step S2803 to step S2815 are the same as those from step S403 to step S415 in FIG. 3.

Figure 22:
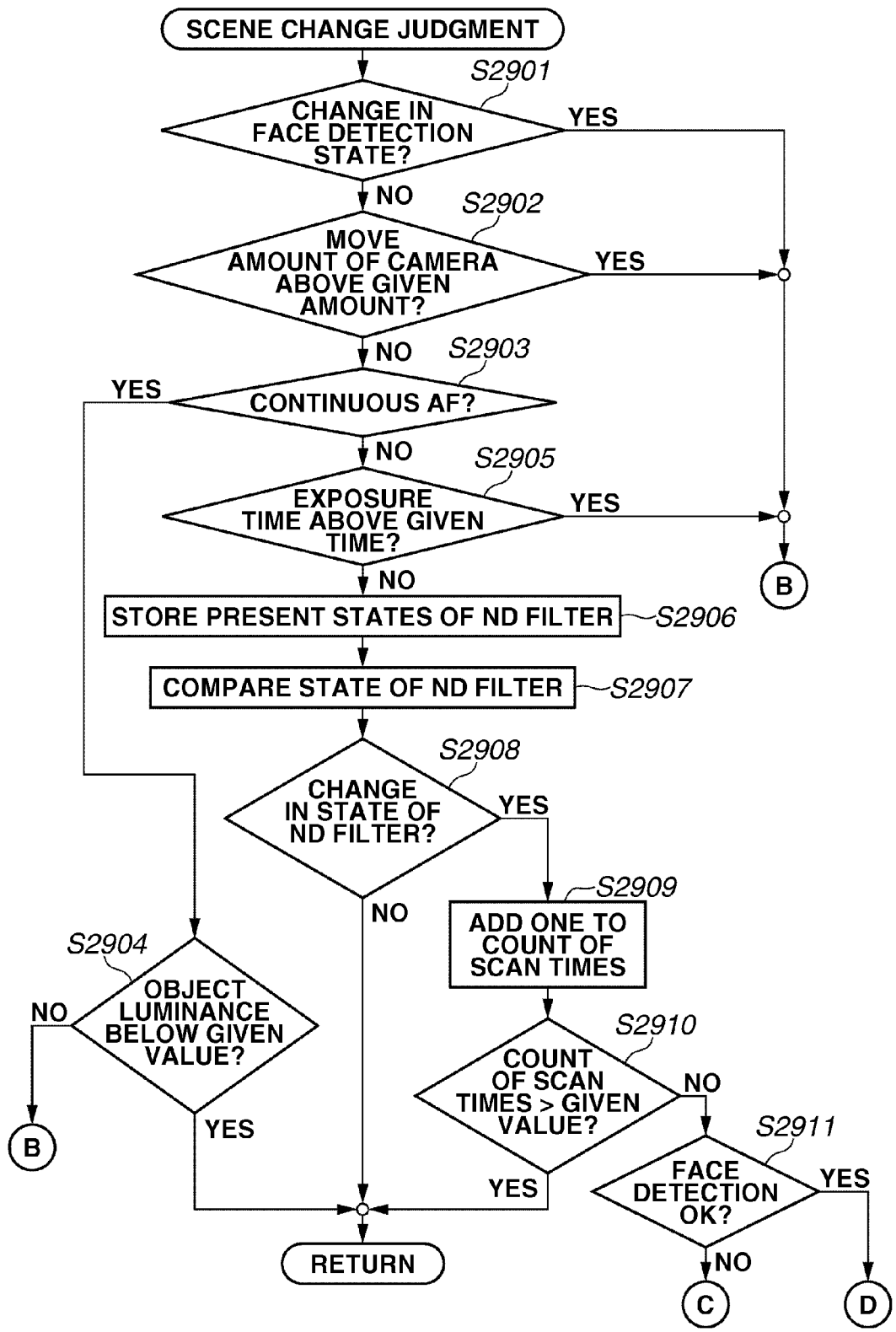
FIG. 22 is a flow chart showing a subroutine of scene change judgment in FIGS. 20, 23 and 24 in the second embodiment.

FIG. 22 is the flow chart of the scene change judgment in the second embodiment. Steps from step S2901 to step S2905 are the same as those from step S501 to step S505 in FIG. 4. In step S2906, the CPU 115 obtains the present state of the ND filter 126, and stores it in the DRAM 113. In step S2907, the present state of the ND filter 126 stored in step S2906 is compared with the state of the ND filter 126 stored in step S2802 in FIG. 21, step S3001 in FIG. 23, or step S3101 in FIG. 24 described below. In step S2908, whether or not the state of the ND filter 126 is changed is checked based on the result of comparison in step S2907. When the state of the ND filter 126 is changed, the step proceeds to step S2909. If not, the current process is finished. Steps of step S2909 onward are the same as those of step S509 onward in FIG. 4.

Figure 23:
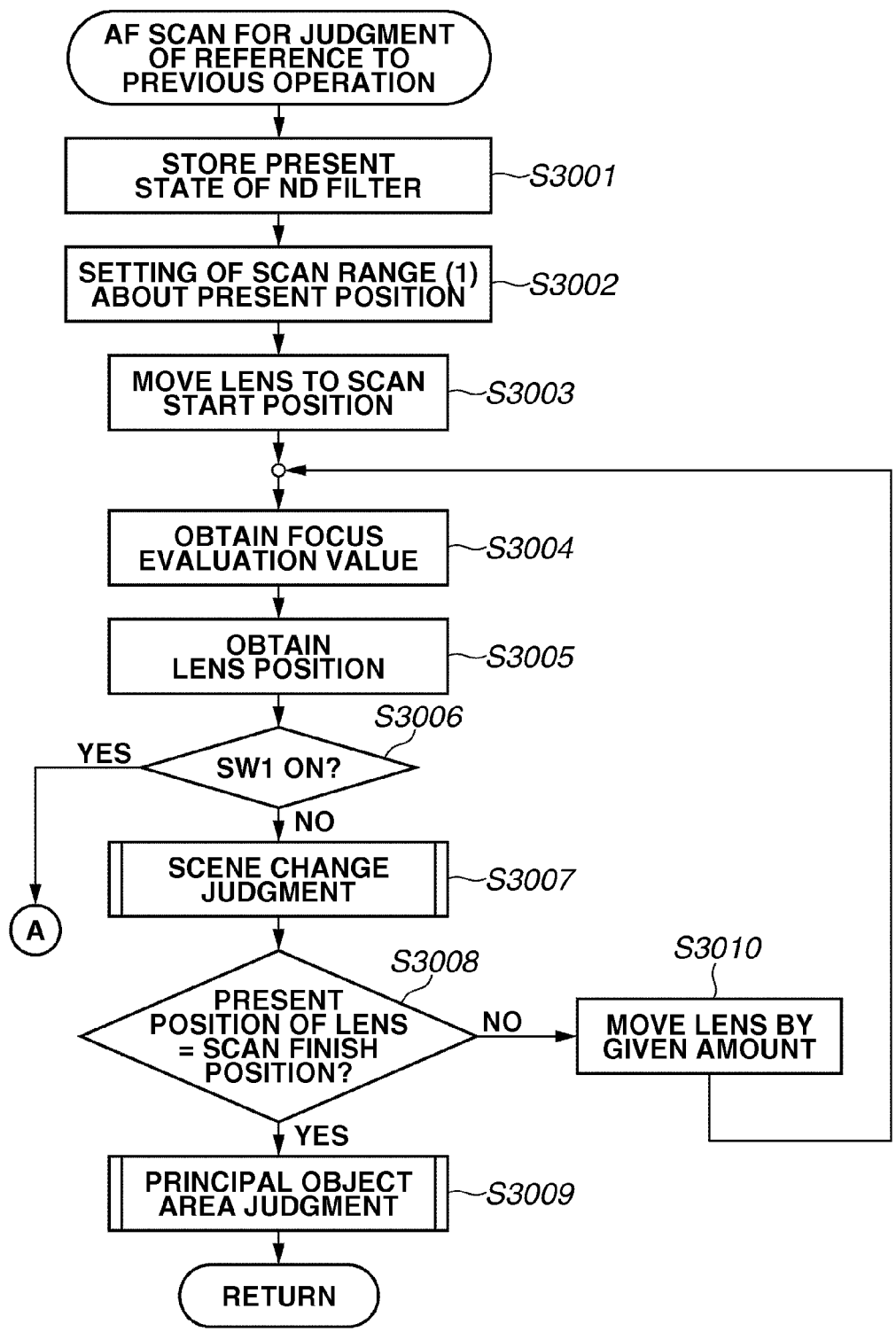
FIG. 23 is a flow chart showing a subroutine of AF scan for judgment of reference to previous operation in the second embodiment.

FIG. 23 is the flow chart of the AF scan for judgment of reference to previous operation in the second embodiment. In step 3001, the CPU 115 obtains the present state of the ND filter 126, and stores it in the DRAM 113. Steps of step S3002 onward are the same as those of step S1102 onward in FIG. 9.

Figure 24:
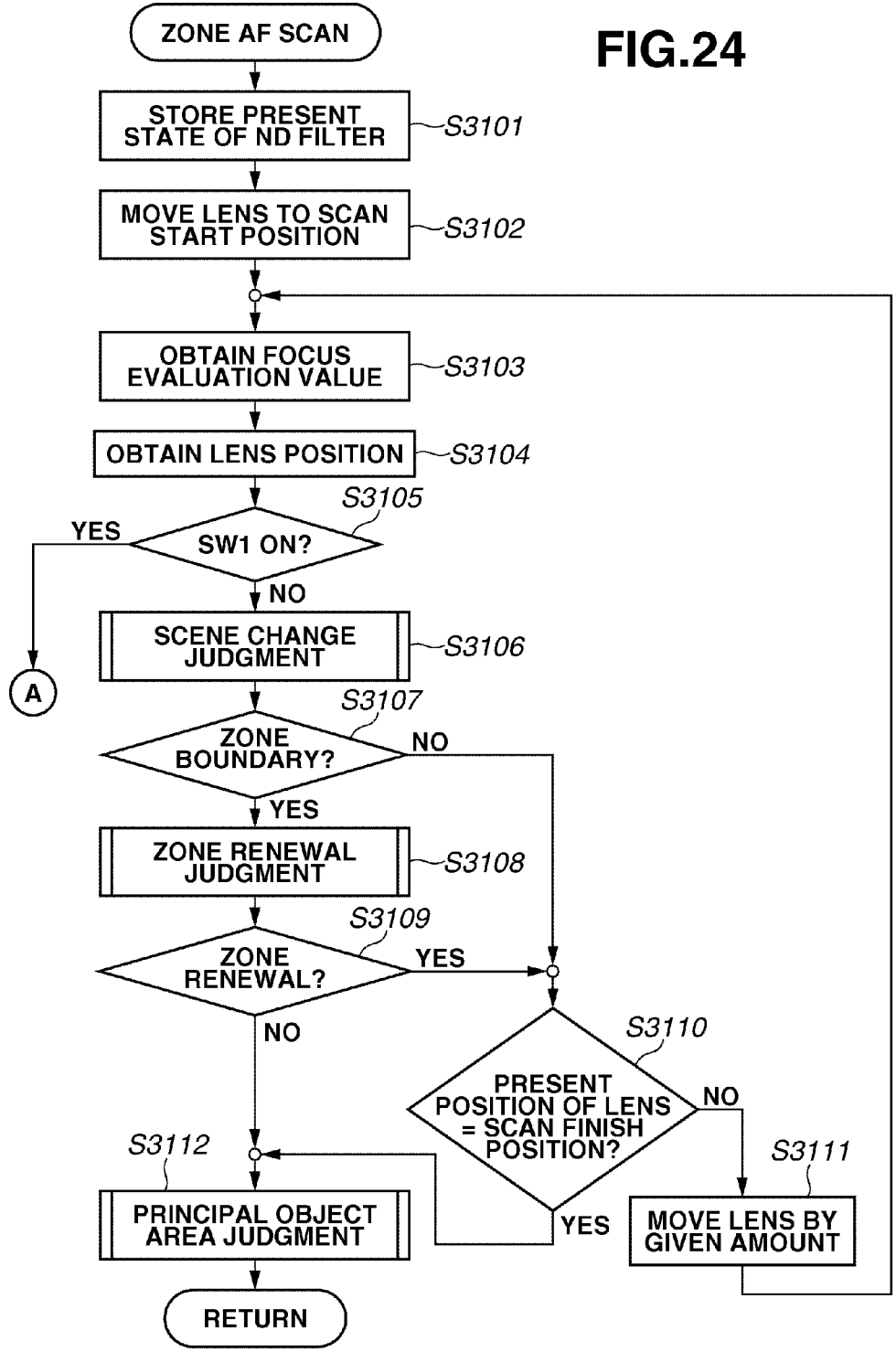
FIG. 24 is a flow chart showing a subroutine of zone AF scan in the second embodiment.

FIG. 24 is the flow chart of the zone AF scan in the second embodiment. In step S3101, the CPU 115 obtains the present state of the ND filter 126, and stores it in the DRAM 113. Steps of step S3102 onward are the same as those of step S1402 onward in FIG. 12.

FIG. 25 is the flow chart of the AE operation for final exposure in the second embodiment. Steps from step S3201 to step S3203 are the same as those from step S2701 to step S2703 in FIG. 20. In step S3204, the ND filter 126 is inserted into or removed from the optical path based on the object luminance calculated in step S3203. Steps S3205 and S3206 are the same as steps S2705 and S2706 in FIG. 20.

As described above, in the second embodiment, in AF scans for the face detection and the object area identification prior to push of SW1, the scan is performed again if the state of the ND filter 126 is changed. Thereby, influence of variation in the focus evaluation value caused by the change in the state of the ND filter 126 during the first scan operation can be eliminated. Further, since the number of scan times is counted so that the scan is not repeated over a given number of times, endless repetition of the scan can be prevented. Furthermore, since the AF operation for final exposure is performed after the ND filter 126 is set in the AE operation for final exposure, the state of the ND filter 126 is not changed during the AF operation for final exposure including the second scan operation. Therefore, influence of the change in the state of the ND filter is eliminated, so that there is no need to perform the AF scan over again.

Except as otherwise discussed herein, the various components shown in outline or in block form in the Figures are individually well known and their internal construction and operation are not critical either to the making or using, or to a description of the best mode of the invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A focus adjustment apparatus comprising:
an image-pickup unit configured to perform image-pickup of an object image input through a focus lens;
a light control unit configured to control an amount of light incident on the image-pickup unit; and
a focus adjusting unit configured to detect at least one focus signal representing a focus state to move the focus lens based on the at least one focus signal,
wherein the focus adjusting unit performs a peak detection operation for detecting a position of the focus lens at which a focus signal is a peak based on the at least one focus signal while moving the focus lens and interrupts the peak detection operation when a state of the light control unit is changed and prior to reception of an instruction for image-taking preparation.

2. The focus adjustment apparatus according to claim 1, wherein the focus adjusting unit performs the peak detection operation again after the interruption of the peak detection operation.

3. The focus adjustment apparatus according to claim 1, further comprising:
a switch;
wherein the instruction is performed in response to the switch being operated.

4. The focus adjustment apparatus according to claim 1, wherein an object area to be focused is determined by the peak detection operation.

5. The focus adjustment apparatus according to claim 4, wherein the focus adjusting unit performs a second peak detection operation for detecting the at least one focus signal while moving the focus lens based on information of the determined object area.

6. The focus adjustment apparatus according to claim 5, wherein the focus adjusting unit performs the second peak detection operation in response to reception of the instruction for image-taking preparation.

7. The focus adjustment apparatus according to claim 1, wherein the focus adjusting unit determines a state of the light control unit in response to reception of the instruction for image-taking preparation.

8. The focus adjustment apparatus according to claim 1, wherein the amount of light incident on the image-pickup unit is controlled based on an output of a calculating unit for calculating luminance of the object from a signal supplied from the image-pickup unit in response to reception of the instruction for image-taking preparation.

9. The focus adjustment apparatus according to claim 1, wherein the focus adjusting unit does not interrupt the peak detection operation when the number of peak detection operations exceeds a predetermined number.

10. The focus adjustment apparatus according to claim 1, wherein the light control unit is a diaphragm.

11. The focus adjustment apparatus according to claim 1, wherein the light control unit is an ND filter.

12. A focus adjustment apparatus comprising:
an image-pickup unit configured to perform image-pickup of an object image input through a focus lens;
a light control unit configured to control an amount of light incident on the image-pickup unit; and
a focus adjusting unit configured to detect at least one focus signal representing a focus state to move the focus lens based on the at least one focus signal,
wherein the focus adjusting unit performs a peak detection operation for detecting a position of the focus lens at which a focus signal is a peak based on the at least one focus signal while moving the focus lens and performs the peak detection operation again when a state of the light control unit is changed and prior to reception of an instruction for image-taking preparation.

13. The focus adjustment apparatus according to claim 12, further comprising:
a switch;
wherein the instruction is performed in response to the switch being operated.

14. A focus adjustment method performed by an apparatus including an image-pickup unit for performing image-pickup of an object image input through a focus lens, and a light control unit for controlling an amount of light incident on the image-pickup unit, the method comprising:
detecting at least one focus signal representing the focus state in a focus detecting area: and
moving the focus lens based on the at least one focus signal,
wherein a peak detection operation for detecting a position of the focus lens at which a focus signal is a peak based on the at least one focus signal while moving the focus lens is performed and
interrupting the peak detection operation when a state of the light control unit is changed and prior to reception of an instruction for image-taking preparation.

15. The focus adjustment method according to claim 14, wherein detecting the at least one focus signal further comprises
performing the peak detection operation again after the interruption of the peak detection operation.

16. The focus adjustment method according to claim 14, wherein
wherein the instruction is performed in response to operation of a switch included in the apparatus.

17. A focus adjustment method performed by an apparatus including an image-pickup unit for performing image-pickup of an object image input through a focus lens, and a light control unit for controlling an amount of light incident on the image-pickup unit, the method comprising:
detecting at least one focus signal representing the focus state in a focus detecting area: and
moving the focus lens based on the at least one focus signal,
wherein detecting the at least one focus signal includes a peak detection operation for detecting a position of the focus lens at which a focus signal is a peak based on the at least one focus signal is performed while moving the focus lens, and
wherein the peak detection operation is performed again when a state of the light control unit is changed and prior to reception of an instruction for image-taking preparation.

18. The focus adjustment method according to claim 17, wherein
wherein the instruction is performed in response to operation of a switch included in the apparatus.

19. A focus adjustment apparatus comprising:
an image-pickup unit configured to perform image-pickup of an object image input through a focus lens;
a light control unit configured to control an amount of light incident on the image-pickup unit; and
a focus adjusting unit configured to detect at least one focus signal representing a focus state to move the focus lens based on the at least one focus signal,
wherein the focus adjusting unit performs an operation for detecting the at least one focus signal while moving the focus lens and interrupts the operation when a state of the light control unit is changed and prior to reception of an instruction for image-taking preparation.

20. A focus adjustment method performed by an apparatus including an image-pickup unit for performing image-pickup of an object image input through a focus lens, and a light control unit for controlling an amount of light incident on the image-pickup unit, the method comprising:
detecting at least one focus signal representing the focus state in a focus detecting area: and
moving the focus lens based on the at least one focus signal,
wherein an operation for detecting the at least one focus signal while moving the focus lens is performed, and
interrupting the operation when a state of the light control unit is changed and prior to reception of an instruction for image-taking preparation.

* * * * *